United States Patent
Saito et al.

(10) Patent No.: US 9,228,129 B2
(45) Date of Patent: *Jan. 5, 2016

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Masayuki Saito, Chiba (JP); Yoshimasa Furusato, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/447,636

(22) Filed: Jul. 31, 2014

(65) Prior Publication Data
US 2015/0060731 A1    Mar. 5, 2015

(30) Foreign Application Priority Data
Aug. 29, 2013   (JP) .................... 2013-178351

(51) Int. Cl.
| | | |
|---|---|---|
| *G02F 1/1333* | (2006.01) | |
| *C09K 19/30* | (2006.01) | |
| *C09K 19/42* | (2006.01) | |
| *C09K 19/44* | (2006.01) | |
| *C09K 19/34* | (2006.01) | |
| *C09K 19/04* | (2006.01) | |
| *C09K 19/12* | (2006.01) | |

(52) U.S. Cl.
CPC .............. *C09K 19/3066* (2013.01); *C09K 19/42* (2013.01); *C09K 19/44* (2013.01); *C09K 2019/0444* (2013.01); *C09K 2019/0466* (2013.01); *C09K 2019/123* (2013.01); *C09K 2019/3016* (2013.01); *C09K 2019/3422* (2013.01)

(58) Field of Classification Search
CPC .............. C09K 2019/3422; C09K 2019/0444; C09K 2019/0466; C09K 2019/123; C09K 2019/3016; C09K 19/42; C09K 19/44; C09K 19/3066; G02F 1/1333
USPC .............. 252/299.01, 299.6, 299.61, 299.63, 252/299.66; 428/1.1; 349/182
See application file for complete search history.

(56) References Cited

U.S. PATENT DOCUMENTS

| 5,403,512 A | 4/1995 | Bartmann et al. |
|---|---|---|
| 2014/0203209 A1* | 7/2014 | Gotoh et al. ............. 252/299.61 |
| 2015/0060732 A1* | 3/2015 | Gotoh et al. ............. 252/299.61 |

FOREIGN PATENT DOCUMENTS

| DE | 19959721 | 6/2000 |
|---|---|---|
| JP | H06500343 | 1/1994 |

\* cited by examiner

*Primary Examiner* — Geraldina Visconti
(74) *Attorney, Agent, or Firm* — Jianq Chyun IP Office

(57) ABSTRACT

To provide a liquid crystal composition satisfying at least one characteristic such as high maximum temperature, low minimum temperature, small viscosity, suitable optical anisotropy, large dielectric anisotropy, large specific resistance, high stability to ultraviolet light, high stability to heat and large elastic constant, or has a suitable balance between at least two of these characteristics. To provide an AM device having short response time, large voltage holding ratio, low threshold voltage, large contrast ratio, long service life and so forth. A liquid crystal composition that has a nematic phase and that comprises a compound having large dielectric anisotropy as a first component and a compound having small viscosity as a second component, and may comprise a compound having high maximum temperature or small viscosity as a third component and a compound having a large dielectric anisotropy as a fourth component, and a liquid crystal display device comprising this composition.

14 Claims, No Drawings

LIQUID CRYSTAL COMPOSITION AND LIQUID CRYSTAL DISPLAY DEVICE

CROSS REFERENCE TO RELATED APPLICATIONS

This application claims the priority benefit of Japan application serial no. 2013-178351, filed on Aug. 29, 2013. The entirety of the above-mentioned patent application is hereby incorporated by reference herein and made a part of this specification.

TECHNICAL FIELD

The invention relates to a liquid crystal composition, a liquid crystal display device comprising this composition and so forth. It relates especially to a liquid crystal composition having positive dielectric anisotropy and an AM (active matrix) device comprising this composition and having a mode of TN, OCB, IPS, FFS or FPA.

TECHNICAL BACKGROUND

In a liquid crystal display device, a classification based on an operating mode for liquid crystal molecules includes modes such as PC (phase change), TN (twisted nematic), STN (super twisted nematic), ECB (electrically controlled birefringence), OCB (optically compensated bend), IPS (in-plane switching), VA (vertical alignment), FFS (fringe field switching) and FPA (field-induced photo-reactive alignment). A classification based on a driving mode in the device includes PM (passive matrix) and AM (active matrix). The PM is classified into static, multiplex and so forth, and the AM is classified into TFT (thin film transistor), MIM (metal-insulator-metal) and so forth. The TFT is further classified into amorphous silicon and polycrystal silicon. The latter is classified into a high temperature type and a low temperature type depending on the production process. A classification based on a light source includes a reflection type utilizing natural light, a transmission type utilizing a backlight and a semi-transmission type utilizing both natural light and a backlight.

The liquid crystal display device comprises a liquid crystal composition having a nematic phase. This composition has suitable characteristics. An AM device having good characteristics can be obtained by an improvement of the characteristics of this composition. Table 1 below summarizes the relationship between these two characteristics. The characteristics of the composition will be further explained on the basis of a commercially available AM device. The temperature range of a nematic phase relates to the temperature range in which the device can be used. A desirable maximum temperature of the nematic phase is approximately 70° C. or higher and a desirable minimum temperature of the nematic phase is approximately −10° C. or lower. The viscosity of the composition relates to the response time of the device. A short response time is desirable for displaying moving images on the device. Response time that is one millisecond shorter than that of the other devices is desirable. Thus a small viscosity of the composition is desirable. A small viscosity at a low temperature is more desirable. The elastic constant of the composition relates to the contrast ratio of the device. A large elastic constant of the composition is desirable for increasing the contrast ratio of the device.

TABLE 1

Characteristics of Compositions and AM Devices

| No. | Characteristics of Compositions | Characteristics of AM Devices |
|---|---|---|
| 1 | wide temperature range of nematic phase | wide temperature range in which device can be used |
| 2 | small viscosity [1] | short response time |
| 3 | suitable optical anisotropy | large contrast ratio |
| 4 | large positive or negative dielectric anisotropy | low threshold voltage and low power consumption, large contrast ratio |
| 5 | large specific resistance | large voltage holding ratio and large contrast ratio |
| 6 | high stability to ultraviolet light and heat | long service life |
| 7 | large elastic constant | large contrast ratio and short response time |

[1] A composition can be injected into a liquid crystal display device in a shorter period of time.

The optical anisotropy of the composition relates to the contrast ratio of the device. A large optical anisotropy or a small optical anisotropy, namely a suitable optical anisotropy, is necessary depending on the mode of the device. The product ($\Delta n \times d$) of the optical anisotropy ($\Delta n$) of the composition and the cell gap (d) of the device is designed so as to maximize the contrast ratio. A suitable value of the product depends on the type of operating mode. A suitable value is approximately 0.45 micrometer for a device having a mode such as TN. In this case, a composition having a large optical anisotropy is desirable for a device having a small cell gap. A large dielectric anisotropy of the composition contributes to a low threshold voltage, low power consumption and a large contrast ratio of the device. A large dielectric anisotropy is thus desirable. A large specific resistance of the composition contributes to a large voltage holding ratio and a large contrast ratio of the device. It is thus desirable that a composition should have a large specific resistance at a temperature close to the maximum temperature of a nematic phase as well as at room temperature in the initial stages. It is desirable that a composition should have a large specific resistance at a temperature close to the maximum temperature of a nematic phase as well as at room temperature, after it has been used for a long time. The stability of the composition to ultraviolet light and heat relates to the service life of the device. The device has a long service life when the stability is high. These kinds of characteristics are desirable for an AM device used for a liquid crystal projector, a liquid crystal television and so forth.

A composition having positive dielectric anisotropy is used for an AM device having a TN mode. A composition having negative dielectric anisotropy is used for an AM device having a VA mode. A composition having positive or negative dielectric anisotropy is used for an AM device having an IPS mode or an FFS mode. A composition having positive or negative dielectric anisotropy is used for an AM device with a PSA (polymer sustained alignment) mode. Examples of the liquid crystal composition having positive dielectric anisotropy are disclosed in the following patent document No. 1 or No. 2.

REFERENCE LIST

Patent Document

Patent document No. 1: DE 19,959,721 A.
Patent document No. 2: JP H06-500343 A (1994).

SUMMARY OF THE INVENTION

The invention concerns a liquid crystal composition that has a nematic phase and comprises at least one compound selected from the group of compounds represented by formula (1) as a first component and at least one compound selected from the group of compounds represented by formula (2) as a second component, and concerns a liquid crystal display device comprising this composition:

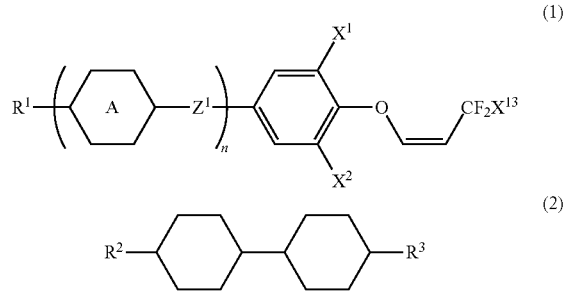

in formula (1) and formula (2), $R^1$ and $R^2$ are independently alkyl having 1 to 12 carbons, alkoxy having 1 to 12 carbons or alkenyl having 2 to 12 carbons; $R^3$ is alkenyl having 2 to 12 carbons or alkenyl having 2 to 12 carbons in which at least one hydrogen has been replaced by fluorine; ring A is 1,4-cyclohexylene, 1,4-phenylene, 2-fluoro-1,4-phenylene, 2,6-difluoro-1,4-phenylene, pyrimidine-2,5-diyl, 1,3-dioxane-2,5-diyl or tetrahydropyran-2,5-diyl; $Z^1$ is a single bond, ethylene, vinylene, methyleneoxy, carbonyloxy or difluoromethyleneoxy; $X^1$, $X^2$ and $X^{13}$ are independently hydrogen or fluorine; and n is 1, 2, 3 or 4. In formula (1), the configuration regarding fluoropropenyloxy that is a right terminal group may be cis (Z) or trans (E).

EMBODIMENT TO CARRY OUT THE INVENTION

One of the aims of the invention is to provide a liquid crystal composition that satisfies at least one of characteristics such as a high maximum temperature of a nematic phase, a low minimum temperature of a nematic phase, a small viscosity, a suitable optical anisotropy, a large dielectric anisotropy, a large specific resistance, a high stability to ultraviolet light, a high stability to heat and a large elastic constant. Another aim is to provide a liquid crystal composition that is suitably balanced between at least two of the characteristics. A further aim is to provide a liquid crystal display device comprising such a composition. A further aim is to provide an AM device that has characteristics such as a short response time, a large voltage holding ratio, a low threshold voltage, a large contrast ratio and a long service life.

One of the advantages of the invention is to provide a liquid crystal composition that satisfies at least one of characteristics such as a high maximum temperature of a nematic phase, a low minimum temperature of a nematic phase, a small viscosity, a suitable optical anisotropy, a large dielectric anisotropy, a large specific resistance, a high stability to ultraviolet light, a high stability to heat and a large elastic constant. Another advantage is to provide a liquid crystal composition that is suitably balanced between at least two of the characteristics. A further advantage is to provide a liquid crystal display device comprising such a composition. A further advantage is to provide an AM device that has characteristics such as a short response time, a large voltage holding ratio, a low threshold voltage, a large contrast ratio and a long service life.

The usage of the terms in the specification and claims is as follows. "Liquid crystal composition" and "liquid crystal display device" are sometimes abbreviated to "composition" and "device," respectively. "Liquid crystal display device" is a generic term for a liquid crystal display panel and a liquid crystal display module. "Liquid crystal compound" is a generic term for a compound having a liquid crystal phase such as a nematic phase or a smectic phase, and for a compound having no liquid crystal phases but being mixed to a composition for the purpose of adjusting the characteristics, such as the temperature range of a nematic phase, the viscosity and the dielectric anisotropy. This compound has a six-membered ring such as 1,4-cyclohexylene or 1,4-phenylene, and its molecular structure is rod-like. "Polymerizable compound" is a compound that is added to a composition in order to form a polymer in it. At least one compound selected from the group of compounds represented by formula (1) is sometimes abbreviated to "compound (1)." "Compound (1)" means one compound or two or more compounds represented by formula (1). This applies to a compound represented by another formula.

A liquid crystal composition is prepared by mixing a plurality of liquid crystal compounds. The ratio of a liquid crystal compound (content) is expressed as a percentage by weight (% by weight) based on the weight of this liquid crystal composition. An additive such as an optically active compound, an antioxidant, an ultraviolet light absorber, a coloring matter, an antifoaming agent, a polymerizable compound, a polymerization initiator and a polymerization inhibitor is added to this liquid crystal composition as required. The ratio of the additive (added amount) is expressed as a percentage by weight (% by weight) based on the weight of the liquid crystal composition in the same manner as with the liquid crystal compound. Weight parts per million (ppm) is sometimes used. The ratio of the polymerization initiator and the polymerization inhibitor is exceptionally expressed on the basis of the weight of the polymerizable compound.

"A higher limit of the temperature range of a nematic phase" is sometimes abbreviated to "the maximum temperature." "A lower limit of the temperature range of a nematic phase" is sometimes abbreviated to "the minimum temperature." That "specific resistance is large" means that a composition has a large specific resistance at a temperature close to the maximum temperature of a nematic phase as well as at room temperature in the initial stages, and that the composition has a large specific resistance at a temperature close to the maximum temperature of a nematic phase as well as at room temperature, after it has been used for a long time. That "a voltage holding ratio is large" means that a device has a large voltage holding ratio at a temperature close to the maximum temperature of a nematic phase as well as at room temperature in the initial stages, and that the device has a large voltage holding ratio at a temperature close to the maximum temperature of a nematic phase as well as at room temperature, after it has been used for a long time.

The expression "at least one 'A'" means that the number of 'A' is arbitrary. The expression "at least one 'A' may be replaced by 'B'" means that the position of 'A' is arbitrary when the number of 'A' is one, and the positions can also be selected without restriction when the number of 'A' is two or more. This rule also applies to the expression "at least one 'A' has been replaced by 'B'."

The symbol for the terminal group, $R^1$, is used for a plurality of compounds in the chemical formulas of component compounds. In these compounds, two groups represented by two arbitrary $R^1$ may be the same or different. In one case, for example, $R^1$ of compound (1-1) is ethyl and $R^1$ of compound (1-2) is ethyl. In another case, $R^1$ of compound (1-1) is ethyl and $R^1$ of compound (1-2) is propyl. The same rule applies to symbols such as $R^4$ and $X^1$. In formula (1), two of ring A are present when n is 2. In this compound, two groups represented by two of ring A may be the same or different. The same rule applies to two arbitrary of ring A, when n is greater than 2. The same rule also applies to symbols such as $Z^1$ and ring B.

2-Fluoro-1,4-phenylene means the two divalent rings described below. Fluorine may be facing left (L) or facing right (R) in a chemical formula. The same rule also applies to an asymmetric divalent ring derived from a ring, such as tetrahydropyran-2,5-diyl.

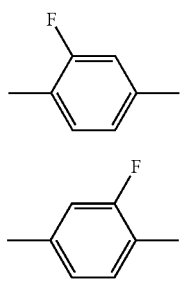

The invention includes the following items. In formula (1) and its sub-formulas, the configuration regarding —O—CH=CH—CF$_2$H or —O—CH=CH—CF$_3$ may be cis or trans.

Item 1. A liquid crystal composition having a nematic phase and comprising at least one compound selected from the group of compounds represented by formula (1) as a first component and at least one compound selected from the group of compounds represented by formula (2) as a second component:

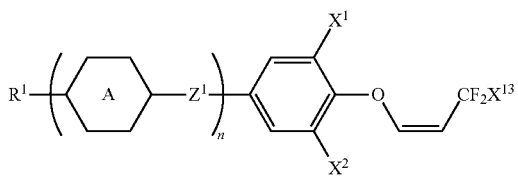

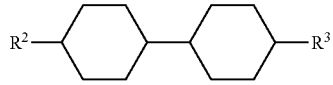

In formula (1) and formula (2), $R^1$ and $R^2$ are independently alkyl having 1 to 12 carbons, alkoxy having 1 to 12 carbons or alkenyl having 2 to 12 carbons; $R^3$ is alkenyl having 2 to 12 carbons or alkenyl having 2 to 12 carbons in which at least one hydrogen has been replaced by fluorine; ring A is 1,4-cyclohexylene, 1,4-phenylene, 2-fluoro-1,4-phenylene, 2,6-difluoro-1,4-phenylene, pyrimidine-2,5-diyl, 1,3-dioxane-2,5-diyl or tetrahydropyran-2,5-diyl; $Z^1$ is a single bond, ethylene, vinylene, methyleneoxy, carbonyloxy or difluoromethyleneoxy; $X^1$, $X^2$ and $X^{13}$ are independently hydrogen or fluorine; and n is 1, 2, 3 or 4.

Item 2. The liquid crystal composition according to item 1, comprising at least one compound selected from the group of compounds represented by formula (1-1) to formula (1-14) as a first component:

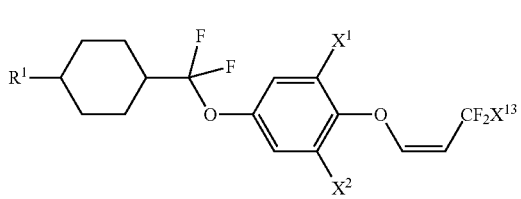

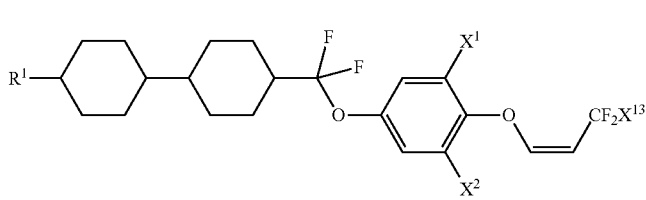

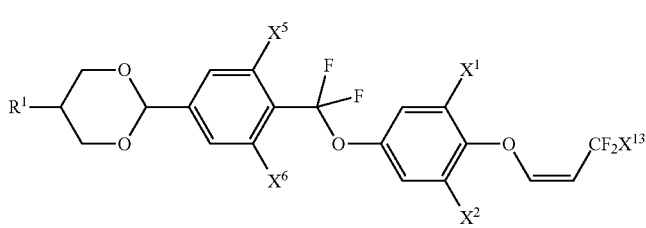

-continued
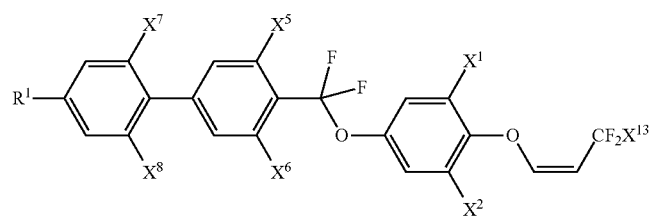
(1-4)
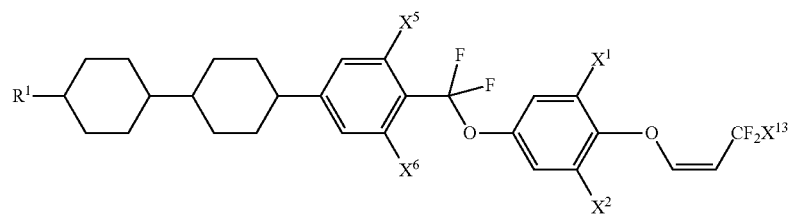
(1-5)
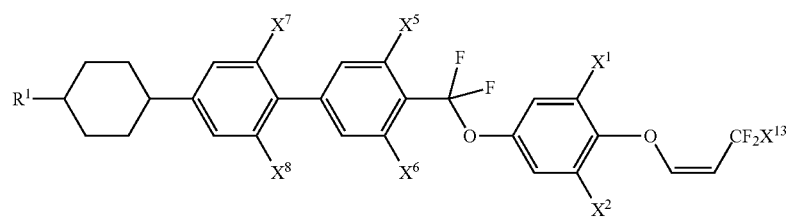
(1-6)
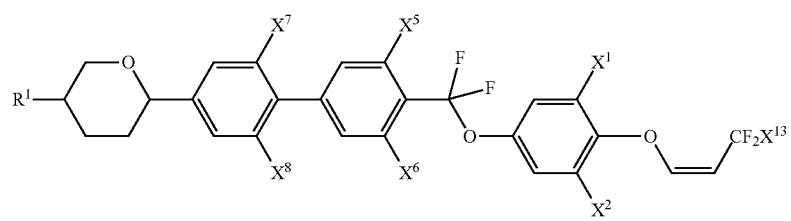
(1-7)
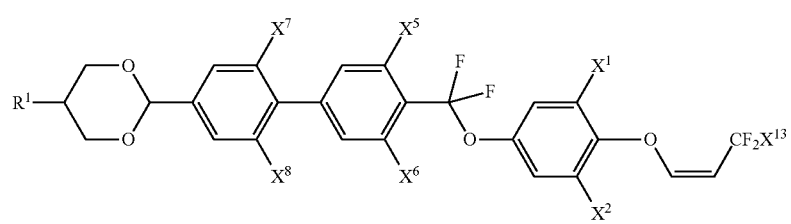
(1-8)
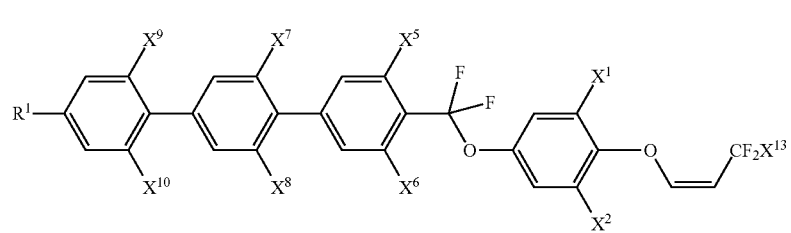
(1-9)
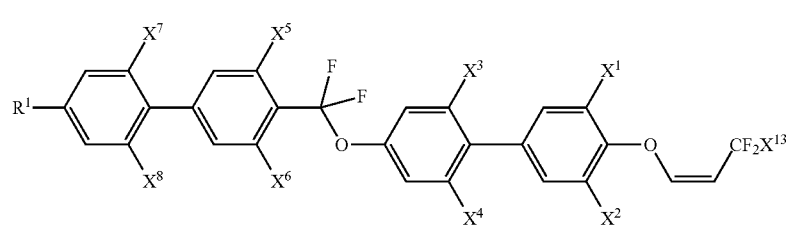
(1-10)

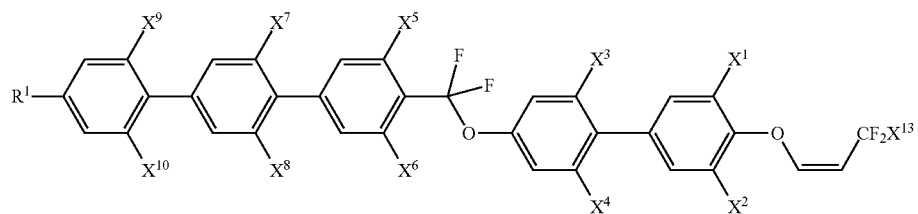
(1-11)

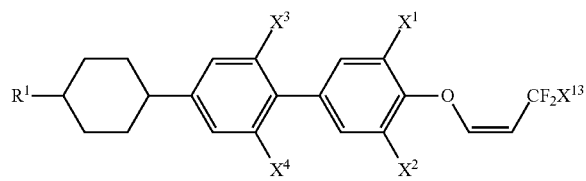
(1-12)

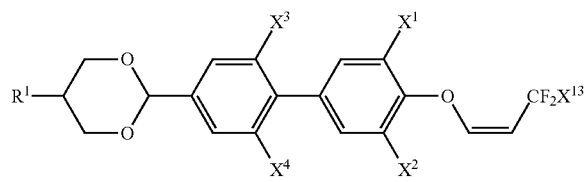
(1-13)

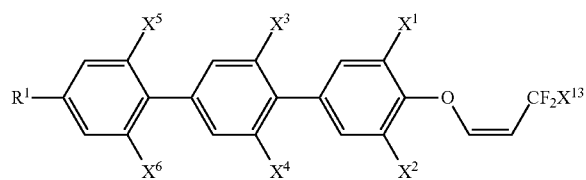
(1-14)

in formula (1-1) to formula (1-14), $R^1$ is alkyl having 1 to 12 carbons, alkoxy having 1 to 12 carbons or alkenyl having 2 to 12 carbons; and $X^1$, $X^2$, $X^3$, $X^4$, $X^5$, $X^6$, $X^7$, $X^8$, $X^9$, $X^{10}$ and $X^{13}$ are independently hydrogen or fluorine.

Item 3. The liquid crystal composition according to item 1 or 2, wherein the ratio of the first component is in the range of 5% by weight to 35% by weight and the ratio of the second component is in the range of 10% by weight to 70% by weight based on the weight of the liquid crystal composition.

Item 4. The liquid crystal composition according to any one of items 1 to 3, further comprising at least one compound selected from the group of compounds represented by formula (3) as a third component:

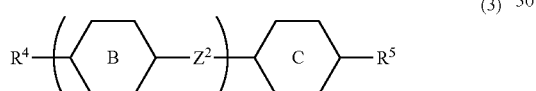
(3)

in formula (3), $R^4$ and $R^5$ are independently alkyl having 1 to 12 carbons, alkoxy having 1 to 12 carbons, alkenyl having 2 to 12 carbons or alkenyl having 2 to 12 carbons in which at least one hydrogen has been replaced by fluorine; ring B and ring C are independently 1,4-cyclohexylene, 1,4-phenylene, 2-fluoro-1,4-phenylene or 2,5-difluoro-1,4-phenylene; $Z^2$ is a single bond, ethylene or carbonyloxy; m is 1, 2 or 3; and ring C is 1,4-phenylene when m is 1.

Item 5. The liquid crystal composition according to any one of items 1 to 4, comprising at least one compound selected from the group of compounds represented by formula (3-1) to formula (3-12) as a third component:

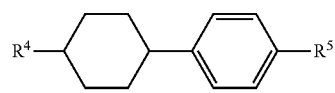
(3-1)

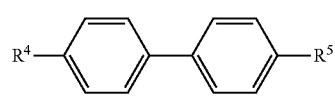
(3-2)

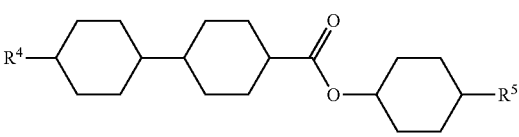
(3-3)

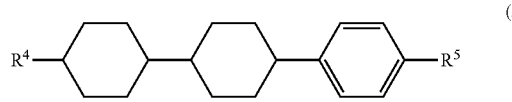
(3-4)

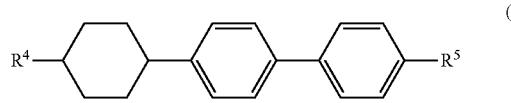
(3-5)

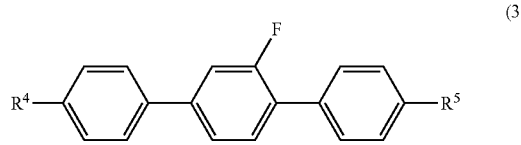
(3-6)

-continued (3-7)
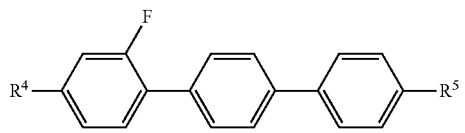

(3-8)
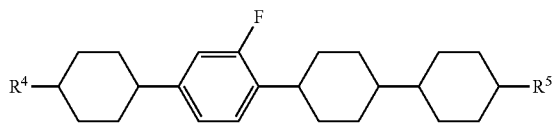

(3-9)
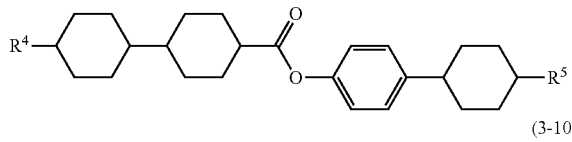

(3-10)
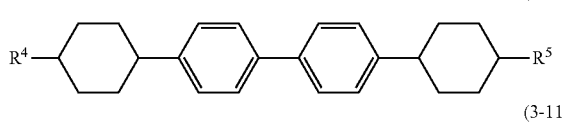

(3-11)
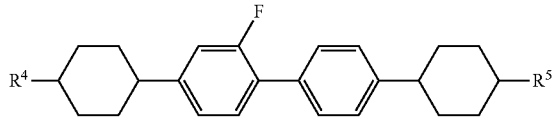

(3-12)
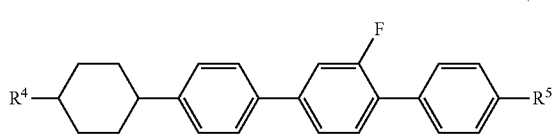

in formula (3-1) to formula (3-12), $R^4$ and $R^5$ are independently alkyl having 1 to 12 carbons, alkoxy having 1 to 12 carbons, alkenyl having 2 to 12 carbons or alkenyl having 2 to 12 carbons in which at least one hydrogen has been replaced by fluorine.

Item 6. The liquid crystal composition according to item 4 or 5, wherein the ratio of the third component is in the range of 5% by weight to 50% by weight based on the weight of the liquid crystal composition.

Item 7. The liquid crystal composition according to any one of items 1 to 6, further comprising at least one compound selected from the group of compounds represented by formula (4) as a fourth component:

(4)
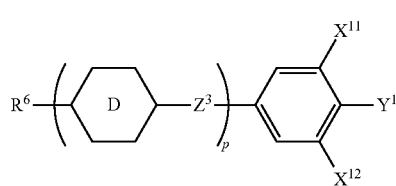

in formula (4), $R^6$ is alkyl having 1 to 12 carbons, alkoxy having 1 to 12 carbons or alkenyl having 2 to 12 carbons; ring ID is 1,4-cyclohexylene, 1,4-phenylene, 2-fluoro-1,4-phenylene, 2,6-difluoro-1,4-phenylene, pyrimidine-2,5-diyl, 1,3-dioxane-2,5-diyl or tetrahydropyran-2,5-diyl; $Z^3$ is a single bond, ethylene, carbonyloxy or difluoromethyleneoxy; $X^{11}$ and $X^{12}$ are independently hydrogen or fluorine; $Y^1$ is fluorine, chlorine, alkyl having 1 to 12 carbons in which at least one hydrogen has been replaced by halogen or alkoxy having 1 to 12 carbons in which at least one hydrogen has been replaced by halogen; and p is 1, 2, 3 or 4.

Item 8. The liquid crystal composition according to any one of items 1 to 7, comprising at least one compound selected from the group of compounds represented by formula (4-1) to formula (4-27) as a fourth component:

(4-1)
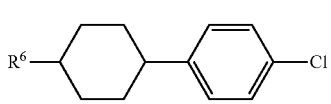

(4-2)
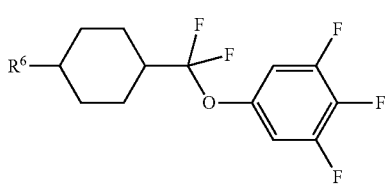

(4-3)
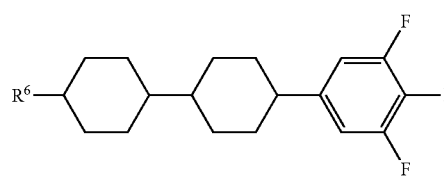

(4-4)
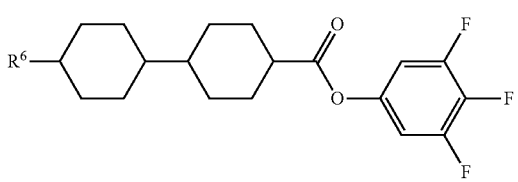

(4-5)
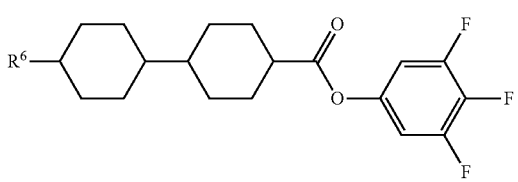

(4-6)
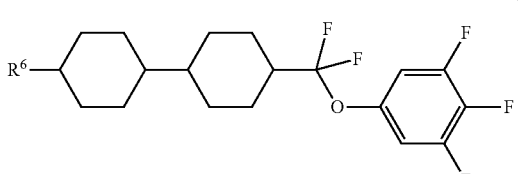

(4-7)
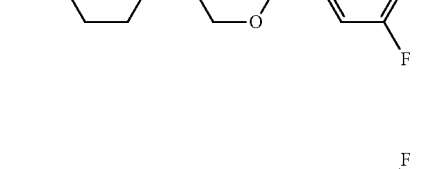

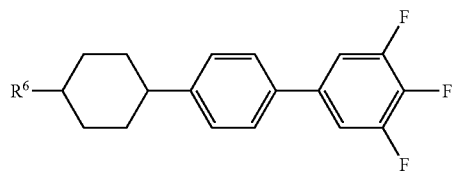
(4-8)
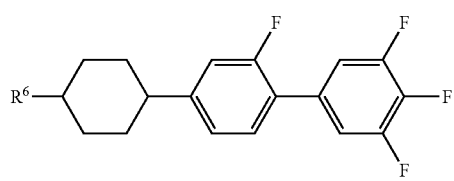
(4-9)
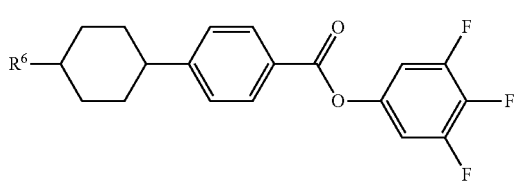
(4-10)
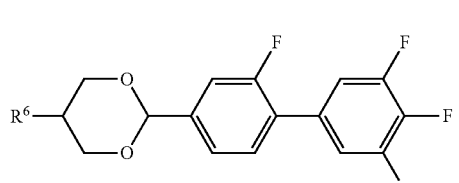
(4-11)
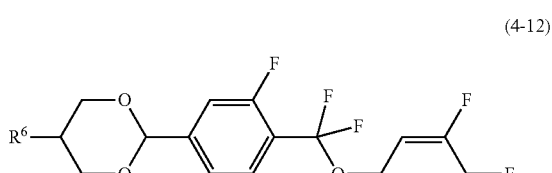
(4-12)
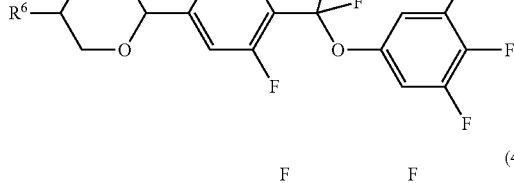
(4-13)
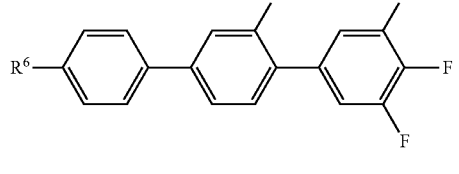
(4-14)
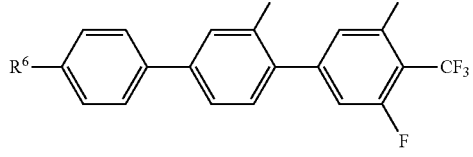
(4-15)
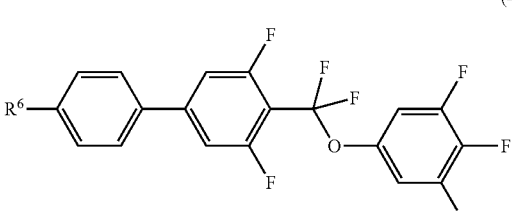
(4-16)
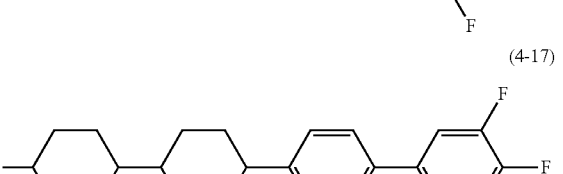
(4-17)
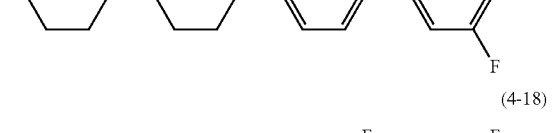
(4-18)
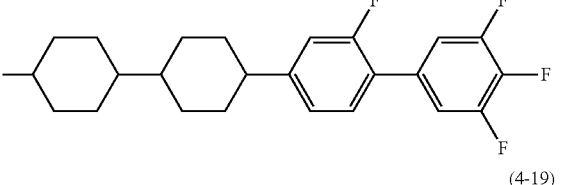
(4-19)
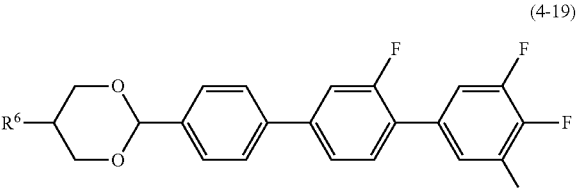
(4-20)
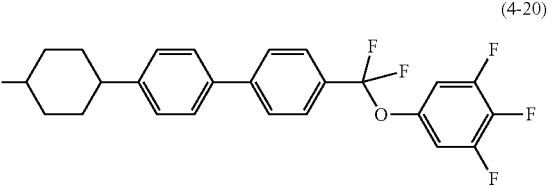
(4-21)
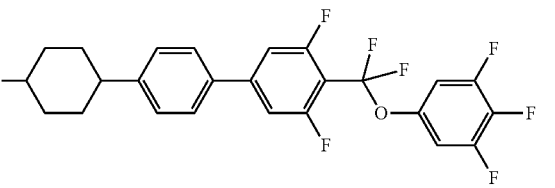
(4-22)
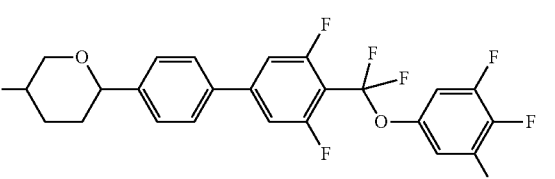

-continued

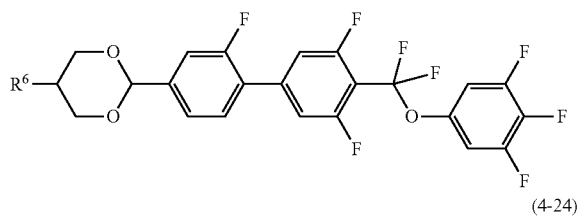
(4-23)

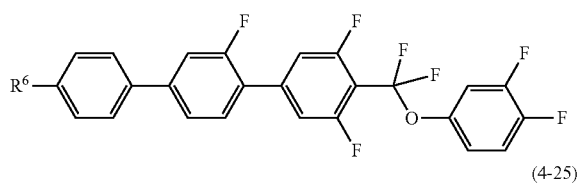
(4-24)

(4-25)

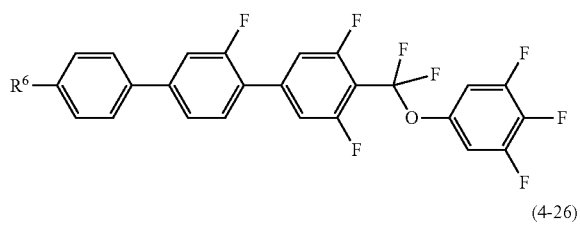
(4-26)

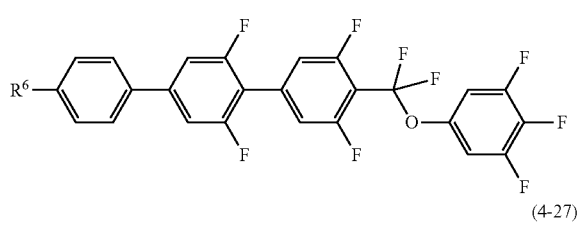
(4-27)

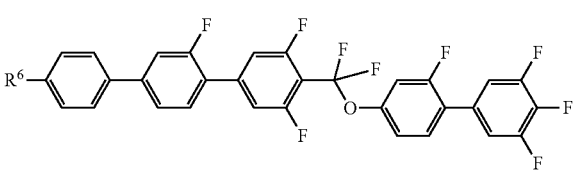

in formula (4-1) to formula (4-27), $R^6$ is alkyl having 1 to 12 carbons, alkoxy having 1 to 12 carbons or alkenyl having 2 to 12 carbons.

Item 9. The liquid crystal composition according to item 7 or 8, wherein the ratio of the fourth component is in the range of 5% by weight to 50% by weight based on the weight of the liquid crystal composition.

Item 10. The liquid crystal composition according to any one of items 1 to 9, wherein the maximum temperature of a nematic phase is 70° C. or higher, and the optical anisotropy (measured at 25° C.) at a wavelength of 589 nanometers is 0.07 or more, and the dielectric anisotropy (measured at 25° C.) at a frequency of 1 kHz is 2 or more.

Item 11. A liquid crystal display device comprising the liquid crystal composition according to any one of items 1 to 10.

Item 12. The liquid crystal display device according to item 11, wherein the operating mode of the liquid crystal display device is a TN mode, an ECB mode, an OCB mode, an IPS mode or a FPA mode, and the driving mode of the liquid crystal display device is an active matrix mode.

Item 13. Use of the liquid crystal composition according to any one of items 1 to 12 for the liquid crystal display device.

The invention further includes the following items. (a) The composition described above, further comprising at least one of additives such as an optically active compound, an antioxidant, an ultraviolet light absorber, a coloring matter, an antifoaming agent, a polymerizable compound, a polymerization initiator and a polymerization inhibitor. (b) The AM device comprising the composition described above. (c) The composition described above, further comprising a polymerizable compound and an AM device with a PSA (polymer sustained alignment) mode, comprising this composition. (d) An AM device with a PSA (polymer sustained alignment) mode, wherein the AM device comprises the composition described above and a polymerizable compound in this composition is polymerized. (e) A device comprising the composition described above and having a mode of PC, TN, STN, ECB, OCB, IPS, VA, FFS or FPA. (f) A transmission-type device comprising the composition described above. (g) Use of the composition described above, as a composition having a nematic phase. (h) Use of the composition prepared by the addition of an optically active compound to the composition described above, as an optically active composition.

The composition of the invention will be explained in the following order. First, the constitution of component compounds in the composition will be explained. Second, the main characteristics of the component compounds and the main effects of these compounds on the composition will be explained. Third, a combination of the components in the composition, a desirable ratio of the components and its basis will be explained. Fourth, a desirable embodiment of the component compounds will be explained. Fifth, desirable component compounds will be shown. Sixth, additives that may be added to the composition will be explained. Seventh, methods for synthesizing the component compounds will be explained. Last, the use of the composition will be explained.

First, the constitution of component compounds in the composition will be explained. The compositions of the invention are classified into composition A and composition B. Composition A may further comprise any other liquid crystal compound, an additive and so forth, in addition to liquid crystal compounds selected from compound (2), compound (3) and compound (4). "Any other liquid crystal compound" is a liquid crystal compound that is different from compound (1), compound (2), compound (3) and compound (4). Such a compound is mixed with the composition for the purpose of further adjusting the characteristics. The additive includes an optically active compound, an antioxidant, an ultraviolet light absorber, a coloring matter, an antifoaming agent, a polymerizable compound, a polymerization initiator and a polymerization inhibitor.

Composition B consists essentially of liquid crystal compounds selected from compound (1), compound (2), compound (3) and compound (4). The term "essentially" means that the composition may comprise an additive, but does not comprise any other liquid crystal compound. Composition B has a smaller number of components than composition A. Composition B is preferable to composition A in view of cost reduction. Composition A is preferable to composition B in view of the fact that characteristics can be further adjusted by mixing with any other liquid crystal compound.

Second, the main characteristics of the component compounds and the main effects of these compounds on the characteristics of the composition will be explained. The main characteristics of the component compounds are summarized in Table 2 on the basis of the effects of the invention. In Table 2, the symbol L stands for "large" or "high", the symbol M stands for "medium", and the symbol S stands for "small" or "low." The symbols L, M and S mean a classification based on a qualitative comparison among the component compounds, and 0 (zero) means that the value is nearly zero.

TABLE 2

| | Characteristics of Compounds | | | |
| --- | --- | --- | --- | --- |
| | Compounds | | | |
| | Compound (1) | Compound (2) | Compound (3) | Compound (4) |
| Maximum Temperature | S-L | M | S-L | S-L |
| Viscosity | M-L | S | S-M | M-L |
| Optical Anisotropy | M-L | S | M-L | M-L |
| Dielectric Anisotropy | M-L | 0 | 0 | S-L |
| Specific Resistance | L | L | L | L |

The main effects of the component compounds on the characteristics of the composition upon mixing the component compounds with the composition are as follows. Compound (1) increases the dielectric anisotropy. Compound (2) decreases the viscosity. Compound (3) increases the maximum temperature, or decreases the minimum temperature. Compound (4) decreases the minimum temperature, and increases the dielectric anisotropy.

Third, a combination of the components in the composition, a desirable ratio of the components and its basis will be explained. A combination of the components in the composition is the first and second components, the first, second and third components, the first, second and forth components, or the first, second, third and fourth components. A desirable combination of the components in the composition is the first, second and third components or the first, second, third and fourth components.

A desirable ratio of the first component is approximately 5% by weight or more for increasing the dielectric anisotropy, and approximately 35% by weight or less for decreasing the minimum temperature or for decreasing the viscosity. A more desirable ratio is in the range of approximately 5% by weight to approximately 25% by weight. An especially desirable ratio is in the range of approximately 5% by weight to approximately 20% by weight.

A desirable ratio of the second component is approximately 10% by weight or more for decreasing the viscosity, and approximately 70% by weight or less for increasing the dielectric anisotropy. A more desirable ratio is in the range of approximately 20% by weight to approximately 60% by weight. An especially desirable ratio is in the range of approximately 30% by weight to approximately 50% by weight.

A desirable ratio of the third component is approximately 5% by weight or more for increasing the maximum temperature or for decreasing the viscosity, and approximately 50% by weight or less for increasing the dielectric anisotropy. A more desirable ratio is in the range of approximately 5% by weight to approximately 40% by weight. An especially desirable ratio is in the range of approximately 5% by weight to approximately 30% by weight.

A desirable ratio of the fourth component is approximately 5% by weight or more for increasing the dielectric anisotropy, and approximately 50% by weight or less for decreasing the minimum temperature. A more desirable ratio is in the range of approximately 15% by weight to approximately 50% by weight. An especially desirable ratio is in the range of approximately 20% by weight to approximately 50% by weight.

Fourth, a desirable embodiment of the component compounds will be explained.

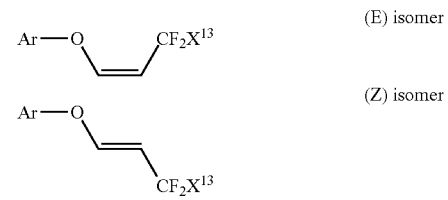

$Ar-O-CH=CH-CF_2X^{13}$ corresponds to compound (1) or its sub-formulas. The configuration of the double bond may be (E)-isomer or (Z)-isomer. The (E) isomer is desirable in view of a small viscosity, a large optical anisotropy and a large dielectric anisotropy. The (Z)-isomer is desirable in view of a small optical anisotropy and an excellent compatibility (miscibility) with other liquid crystal compounds. The (E)-isomer is preferable to the (Z)-isomer in view of a suitable valance of the characteristics.

$R^1$, $R^2$ and $R^6$ are independently alkyl having 1 to 12 carbons, alkoxy having 1 to 12 carbons or alkenyl having 2 to 12 carbons. Desirable $R^1$, $R^2$ or $R^6$ is alkyl having 1 to 12 carbons for increasing the stability to ultraviolet light or heat. $R^3$ is alkenyl having 2 to 12 carbons or alkenyl having 2 to 12 carbons in which at least one hydrogen has been replaced by fluorine. $R^4$ and $R^5$ are independently alkyl having 1 to 12 carbons, alkoxy having 1 to 12 carbons, alkenyl having 2 to 12 carbons or alkenyl having 2 to 12 carbons in which at least one hydrogen has been replaced by fluorine. Desirable $R^4$ or $R^5$ is alkyl having 1 to 12 carbons for increasing the stability to ultraviolet light or heat, for instance, and alkenyl having 2 to 12 carbons for decreasing the minimum temperature or for decreasing the viscosity. The alkyl is straight-chain or branched-chain, and does not include cycloalkyl. Straight-chain alkyl is preferable to branched-chain alkyl. This applies to alkoxy, alkenyl and alkenyl in which at least one hydrogen has been replaced by fluorine.

Desirable alkyl is methyl, ethyl, propyl, butyl, pentyl, hexyl, heptyl or octyl. More desirable alkyl is ethyl, propyl, butyl, pentyl or heptyl for decreasing the viscosity.

Desirable alkoxy is methoxy, ethoxy, propoxy, butoxy, pentyloxy, hexyloxy or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. More desirable alkenyl is vinyl, 1-propenyl, 3-butenyl or 3-pentenyl for decreasing the viscosity. A desirable configuration of —CH=CH— in the alkenyl depends on the position of the double bond. Trans is preferable in the alkenyl such as 1-propenyl, 1-butenyl, 1-pentenyl, 1-hexenyl, 3-pentenyl and 3-hexenyl for decreasing the viscosity. Cis is preferable in the alkenyl such as 2-butenyl, 2-pentenyl and 2-hexenyl.

Desirable examples of alkenyl in which at least one hydrogen has been replaced by fluorine are 2,2-difluorovinyl, 3,3-difluoro-2-propenyl, 4,4-difluoro-3-butenyl, 5,5-difluoro-4-pentenyl or 6,6-difluoro-5-hexenyl. More desirable examples are 2,2-difluorovinyl or 4,4-difluoro-3-butenyl for decreasing the viscosity.

n is 1, 2, 3 or 4. Desirable n is 2 for decreasing the minimum temperature. m is 1, 2 or 3. Desirable m is 2 for increasing the maximum temperature. p is 1, 2, 3 or 4. Desirable p is 2 for decreasing the minimum temperature, and 3 for increasing the dielectric anisotropy.

$Z^1$ is a single bond, ethylene, vinylene, methyleneoxy, carbonyloxy or difluoromethyleneoxy. Desirable $Z^1$ is difluoromethyleneoxy for increasing the dielectric anisotropy. $Z^2$ is a single bond, ethylene or carbonyloxy. Desirable $Z^2$ is a single bond for decreasing the viscosity. $Z^3$ is a single bond, ethylene, carbonyloxy or difluoromethyleneoxy. Desirable $Z^3$ is difluoromethyleneoxy for increasing the dielectric anisotropy.

Ring A is 1,4-cyclohexylene, 1,4-phenylene, 2-fluoro-1,4-phenylene, 2,6-difluoro-1,4-phenylene, pyrimidine-2,5-diyl, 1,3-dioxane-2,5-diyl or tetrahydropyran-2,5-diyl. Desirable ring A is 1,4-phenylene or 2-fluoro-1,4-phenylene for increasing the optical anisotropy. Ring B and ring C are independently 1,4-cyclohexylene, 1,4-phenylene, 2-fluoro-1,4-phenylene or 2,5-difluoro-1,4-phenylene. Desirable ring B or ring C is 1,4-cyclohexylene for decreasing the viscosity, or 1,4-phenylene for increasing the optical anisotropy. Ring D is 1,4-cyclohexylene, 1,4-phenylene, 2-fluoro-1,4-phenylene, 2,6-difluoro-1,4-phenylene, pyrimidine-2,5-diyl, 1,3-dioxane-2,5-diyl or tetrahydropyran-2,5-diyl. Desirable ring D is 1,4-phenylene or 2-fluoro-1,4-phenylene for increasing the optical anisotropy. With regard to the configuration of 1,4-cyclohexylene, trans is preferable to cis for increasing the maximum temperature. Tetrahydropyran-2,5-diyl is

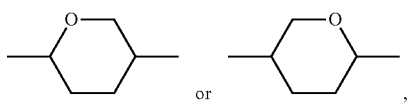

and is preferably

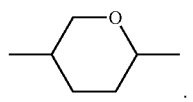

.

$X^1$, $X^2$, $X^3$, $X^4$, $X^5$, $X^6$, $X^7$, $X^8$, $X^9$, $X^{10}$, $X^{11}$, $X^{12}$ and $X^{13}$ are independently hydrogen or fluorine. Desirable $X^1$, $X^2$, $X^3$, $X^4$, $X^5$, $X^6$, $X^7$, $X^8$, $X^9$, $X^{10}$, $X^{11}$, $X^{12}$ or $X^{13}$ is fluorine for increasing the dielectric anisotropy.

$Y^1$ is fluorine, chlorine, alkyl having 1 to 12 carbons in which at least one hydrogen has been replaced by halogen or alkoxy having 1 to 12 carbons in which at least one hydrogen has been replaced by halogen. Halogen means fluorine, chlorine, bromine and iodine. Desirable halogen is fluorine and chlorine. More desirable halogen is fluorine. A desirable example of alkyl in which at least one hydrogen has been replaced by halogen is trifluoromethyl. A desirable example of alkoxy in which at least one hydrogen has been replaced by halogen is trifluoromethoxy. Desirable $Y^1$ is fluorine for decreasing the minimum temperature.

Fifth, desirable component compounds will be shown. Desirable compound (1) is compound (1-1) to compound (1-14) described above. In these compounds, it is desirable that at least one of the first component should be compound (1-3), compound (1-4), compound (1-5), compound (1-6), compound (1-8), compound (1-9), compound (1-13) or compound (1-14). It is desirable that at least two of the first component should be a combination of compound (1-3) and compound (1-8), compound (1-4) and compound (1-6), compound (1-4) and compound (1-9) or compound (1-13) and compound (1-14).

Desirable compound (3) is compound (3-1) to compound (3-12) described above. In these compounds, it is desirable that at least one of the third component should be compound (3-2), compound (3-4), compound (3-5), compound (3-6), compound (3-9) or compound (3-12). It is desirable that at least two of the third component should be a combination of compound (3-2) and compound (3-4), compound (3-2) and compound (3-5) or compound (3-2) and compound (3-6).

Desirable compound (4) is compound (4-1) to compound (4-27) described above. In these compounds, it is desirable that at least one of the fourth component should be compound (4-5), compound (4-11), compound (4-12), compound (4-13), compound (4-15), compound (4-16), compound (4-20), compound (4-23) or compound (4-25). It is desirable that at least two of the fourth component should be compound (4-12) and compound (4-23), compound (4-13) and compound (4-16), compound (4-15) and compound (4-16), compound (4-16) and compound (4-25) or compound (4-23) and compound (4-25).

Sixth, additives that may be added to the composition will be explained. Such additives include an optically active compound, an antioxidant, an ultraviolet light absorber, a coloring matter, an antifoaming agent, a polymerizable compound, a polymerization initiator and a polymerization inhibitor. The optically active compound is added to the composition for the purpose of inducing the helical structure of liquid crystal molecules and giving a twist angle. Examples of such compounds include compound (5-1) to compound (5-5). A desirable ratio of the optically active compound is approximately 5% by weight or less, and a more desirable ratio is in the range of approximately 0.01% by weight to approximately 2% by weight.

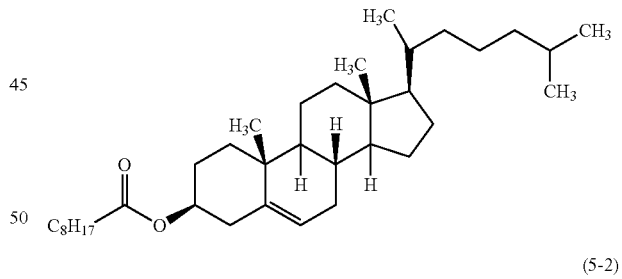

(5-1)

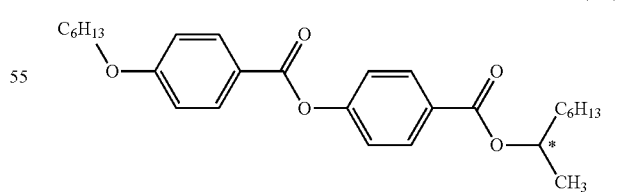

(5-2)

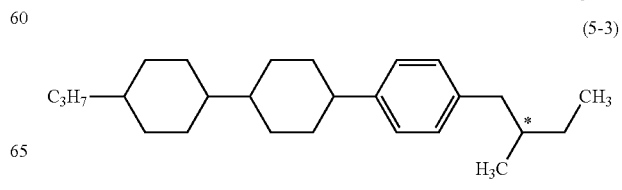

(5-3)

-continued

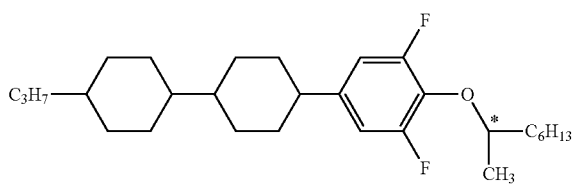

(5-4)

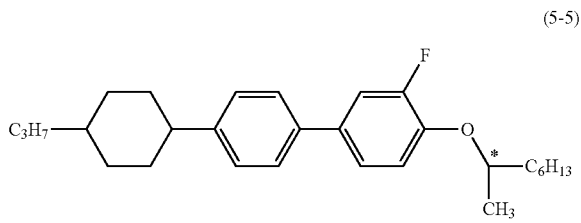

(5-5)

The antioxidant is added to the composition in order to prevent a decrease in specific resistance that is caused by heating under air, or to maintain a large voltage holding ratio at a temperature close to the maximum temperature of a nematic phase as well as at room temperature, after the device has been used for a long time. A desirable example of the antioxidant is compound (6) where t is an integer from 1 to 9, for instance.

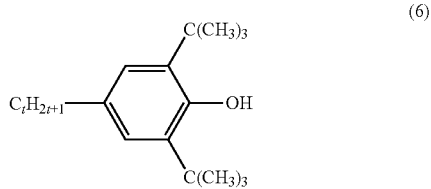

(6)

In compound (6), desirable t is 1, 3, 5, 7 or 9. More desirable t is 7. Compound (6) where t is 7 is effective in maintaining a large voltage holding ratio at a temperature close to the maximum temperature of a nematic phase as well as at room temperature, after the device has been used for a long time, since it has a small volatility. A desirable ratio of the antioxidant is approximately 50 ppm or more for achieving its effect and is approximately 600 ppm or less for avoiding a decrease in the maximum temperature or avoiding an increase in the minimum temperature. A more desirable ratio is in the range of approximately 100 ppm to approximately 300 ppm.

Desirable examples of the ultraviolet light absorber include benzophenone derivatives, benzoate derivatives and triazole derivatives. A light stabilizer such as an amine having steric hindrance is also desirable. A desirable ratio of the ultraviolet light absorber or the light stabilizer is approximately 50 ppm or more for achieving its effect and is approximately 10,000 ppm or less for avoiding a decrease in the maximum temperature or avoiding an increase in the minimum temperature. A more desirable ratio is in the range of approximately 100 ppm to approximately 10,000 ppm.

A dichroic dye such as an azo dye or an anthraquinone dye is added to the composition for adjusting to a device having a guest host (GH) mode. A desirable ratio of the coloring matter is in the range of approximately 0.01% by weight to approximately 10% by weight. The antifoaming agent such as dimethyl silicone oil or methyl phenyl silicone oil is added to the composition for preventing foam formation. A desirable ratio of the antifoaming agent is approximately 1 ppm or more for achieving its effect and is approximately 1,000 ppm or less for avoiding a poor display. A more desirable ratio is in the range of approximately 1 ppm to approximately 500 ppm.

The polymerizable compound is added to the composition for adjusting to a device with a PSA (polymer sustained alignment) mode. Desirable examples of the polymerizable compound include compounds having a polymerizable group, such as acrylates, methacrylates, vinyl compounds, vinyloxy compounds, propenyl ethers, epoxy compounds (oxiranes, oxetanes) and vinyl ketones. More desirable examples are acrylate derivatives or methacrylate derivatives. A desirable ratio of the polymerizable compound is approximately 0.05% by weight or more for achieving its effect and is approximately 10% by weight or less for avoiding a poor display. A more desirable ratio is in the range of approximately 0.1% by weight to approximately 2% by weight.

The polymerizable compound is polymerized on irradiation with ultraviolet light. It may be polymerized in the presence of a initiator such as a photopolymerization initiator. Suitable conditions for polymerization, and a suitable type and amount of the initiator are known to a person skilled in the art and are described in the literature. For example, Irgacure 651 (registered trademark; BASF), Irgacure 184 (registered trademark; BASF) or Darocure 1173 (registered trademark; BASF), each of which is a photoinitiator, is suitable for radical polymerization. A desirable ratio of the photopolymerization initiator is in the range of approximately 0.1% by weight to approximately 5% by weight based on the weight of the polymerizable compound. A more desirable ratio is in the range of approximately 1% by weight to approximately 3% by weight.

The polymerization inhibitor may be added in order to prevent the polymerization when a polymerizable compound is kept in storage. The polymerizable compound is usually added to the composition without removing the polymerization inhibitor. Examples of the polymerization inhibitor include hydroquinone derivatives such as hydroquinone and methylhydroquinone, 4-tert-butylcatechol, 4-methoxyphenol and phenothiazine.

Seventh, methods for synthesizing the component compounds will be explained. These compounds can be synthesized by known methods. The synthetic methods will be exemplified as follows. Compound (2) is prepared by the method described in JP S59-176221 A (1981). Compound (3-12) is prepared by the method described in JP H02-237949 A(1990). Compound (4-3) and compound (4-8) are prepared by the method described in JP H02-233626 A (1990). An antioxidant is commercially available. The compound of formula (6) where t is 1 is available from Sigma-Aldrich Corporation. Compound (6) where t is 7, for instance, is synthesized according to the method described in U.S. Pat. No. 3,660,505.

Compound (1-2) is prepared by the method described below. A synthetic method is explained by using an example of the compound of formula (1-2) where $X^1$, $X^2$ and $X^{13}$ are fluorine.

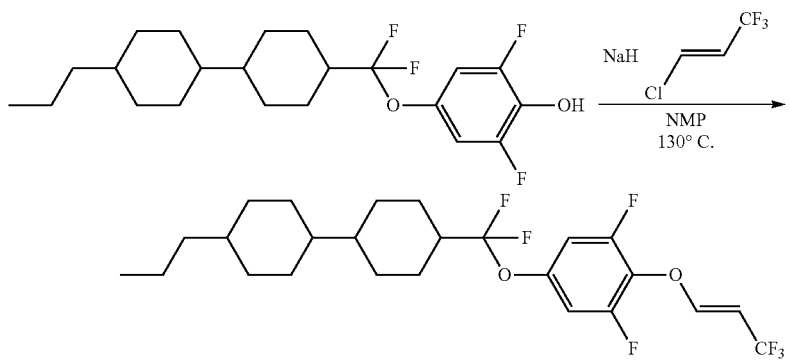

4-(Difluoro(4'-propyl-[1,1'-bi(cyclohexane)]-4-yl)methoxy)-2,6-difluorophenol (3.0 g, 7.45 mmol) prepared by known methods and sodium hydride (55%) (0.325 g, 7.45 mmol) were stirred in NMP (N-methylpyroridone) at 60° C. for 30 minutes. (E)-1-Chloro-3,3,3-trifluoro-1-propene (2.43 g, 18.6 mmol) was then added to the reaction solution, and the mixture was stirred at 130° C. for 24 hours. The reaction solution was poured into water, which was extracted with toluene. The combined organic layers were washed with water and brine, and then dried over anhydrous magnesium sulfate. The solvent was distilled off with an evaporator and the residue was purified by silica gel chromatography and then by recrystallization to give (E)-4-((3,5-difluoro-4-((3,3,3-trifluoro-1-propen-1-yl)oxy)phenoxy)difluoromethyl)-4'-propyl-1,1'-bi(cyclohexane) (56% yield).

$^1$H-NMR (CDCl$_3$; δ ppm): δ 7.22-7.17 (m, 1H), 6.90-6.85 (m, 2H), 5.22 (dq, 1H), 2.05-1.94 (m, 3H), 1.88-1.82 (m, 2H), 1.80-1.68 (m, 4H), 1.39-1.25 (m, 4H), 1.20-0.93 (m, 9H) and 0.91-0.80 (m, 5H).

Compounds whose synthetic methods are not described can be prepared according to the methods described in books such as "Organic Syntheses" (John Wiley & Sons, Inc.), "Organic Reactions" (John Wiley & Sons, Inc.), "Comprehensive Organic Synthesis" (Pergamon Press), and "Shin-Jikken Kagaku Kouza" (New experimental Chemistry Course, in English; Maruzen Co., Ltd., Japan). The composition is prepared according to known methods using the compounds thus obtained. For example, the component compounds are mixed and dissolved in each other by heating.

Last, the use of the composition will be explained. The composition of the invention mainly has a minimum temperature of approximately −10° C. or lower, a maximum temperature of approximately 70° C. or higher, and an optical anisotropy in the range of approximately 0.07 to approximately 0.20. A device comprising this composition has a large voltage holding ratio. This composition is suitable for an AM device. This composition is suitable especially for an AM device having a transmission type. A composition having an optical anisotropy in the range of approximately 0.08 to approximately 0.25 may be prepared by adjusting ratios of the component compounds or by mixing with any other liquid crystal compound. Furthermore, a composition having an optical anisotropy in the range of approximately 0.10 to approximately 0.30 may be prepared by this method. This composition can be used as a composition having a nematic phase and as an optically active composition by adding an optically active compound.

The composition can be used for an AM device. It can also be used for a PM device. The composition can also be used for the AM device and the PM device having a mode such as PC, TN, STN, ECB, OCB, IPS, FFS, VA and FPA. It is especially desirable to use the composition for the AM device having a mode of TN, OCB, IPS or FFS. In the AM device having the IPS or FFS mode, the orientation of liquid crystal molecules may be parallel or perpendicular to a glass substrate, when no voltage is applied. These devices may be of a reflection type, a transmission type or a semi-transmission type. It is desirable to use the composition for a device having the transmission type. It can be used for an amorphous silicon-TFT device or a polycrystal silicon-TFT device. The composition is also usable for an NCAP (nematic curvilinear aligned phase) device prepared by microcapsulating the composition, and for a PD (polymer dispersed) device in which a three-dimensional network-polymer is formed in the composition.

EXAMPLES

The invention will be explained in more detail by way of examples. The invention is not limited to the examples. The invention includes a mixture of the composition in Example 1 and the composition in Example 2. The invention also includes a mixture prepared by mixing at least two compositions in Examples. Compounds prepared herein were identified by methods such as NMR analysis. The characteristics of the compounds, compositions and devices were measured by the methods described below.

NMR Analysis

A model DRX-500 apparatus made by Bruker BioSpin Corporation was used for measurement. In the measurement of $^1$H-NMR, a sample was dissolved in a deuterated solvent such as CDCl$_3$, and the measurement was carried out under the conditions of room temperature, 500 MHz and the accumulation of 16 scans. Tetramethylsilane was used as an internal standard. In the measurement of $^{19}$F-NMR, CFCl$_3$ was used as the internal standard, and 24 scans were accumulated. In the explanation of the nuclear magnetic resonance spectra, the symbols s, d, t, q, quin, sex, m and br stand for a singlet, a doublet, a triplet, a quartet, a quintet, a sextet, a multiplet and line-broadening, respectively.

Gas Chromatographic Analysis:

A gas chromatograph Model GC-14B made by Shimadzu Corporation was used for measurement. The carrier gas was helium (2 milliliters per minute). The sample injector and the detector (FID) were set to 280° C. and 300° C., respectively. A capillary column DB-1 (length 30 meters, bore 0.32 millimeter, film thickness 0.25 micrometer, dimethylpolysiloxane as the stationary phase, non-polar) made by Agilent Technologies, Inc. was used for the separation of component compounds. After the column had been kept at 200° C. for 2 minutes, it was further heated to 280° C. at the rate of 5° C. per minute. A sample was dissolved in acetone (0.1% by weight), and 1 microliter of the solution was injected into the sample injector. A recorder used was a Model C-R5A Chromatopac Integrator made by Shimadzu Corporation or its equivalent. The resulting gas chromatogram showed the retention time of peaks and the peak areas corresponding to the component compounds.

Solvents for diluting the sample may also be chloroform, hexane and so forth. The following capillary columns may also be used in order to separate the component compounds: HP-1 made by Agilent Technologies Inc. (length 30 meters, bore 0.32 millimeter, film thickness 0.25 micrometer), Rtx-1 made by Restek Corporation (length 30 meters, bore 0.32 millimeter, film thickness 0.25 micrometer), and BP-1 made by SGE International Pty. Ltd. (length 30 meters, bore 0.32 millimeter, film thickness 0.25 micrometer). A capillary column CBP1-M50-025 (length 50 meters, bore 0.25 millimeter, film thickness 0.25 micrometer) made by Shimadzu Corporation may also be used for the purpose of avoiding an overlap of peaks of the compounds.

The ratio of the liquid crystal compounds comprised in the composition may be calculated according to the following method. The liquid crystal compounds are detected by use of a gas chromatograph (FID). The ratio of peak areas in the gas chromatogram corresponds to the ratio (ratio by weight) of the liquid crystal compounds. When the capillary columns described above are used, the correction coefficient of respective liquid crystal compounds may be regarded as 1 (one). Accordingly, the ratio (percentage by weight) of the liquid crystal compounds can be calculated from the ratio of peak areas.

Samples for Measurement

A composition itself was used as a sample when the characteristics of the composition were measured. When the characteristics of a compound were measured, a sample for measurement was prepared by mixing this compound (15% by weight) with mother liquid crystals (85% by weight). The characteristic values of the compound were calculated from the values obtained from measurements by an extrapolation method: (Extrapolated value)=(Measured value of sample)−0.85×(Measured value of mother liquid crystals)/0.15. When a smectic phase (or crystals) deposited at 25° C. at this ratio, the ratio of the compound to the mother liquid crystals was changed in the order of (10% by weight: 90% by weight), (5% by weight: 95% by weight) and (1% by weight: 99% by weight). The values of the maximum temperature, the optical anisotropy, the viscosity and the dielectric anisotropy regarding the compound were obtained by means of this extrapolation method.

The mother liquid crystals described below were used. The ratio of the component compounds were expressed as a percentage by weight.

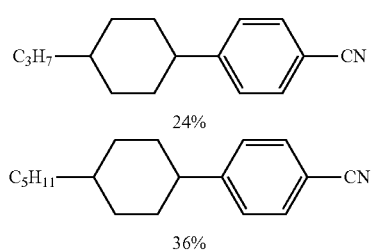

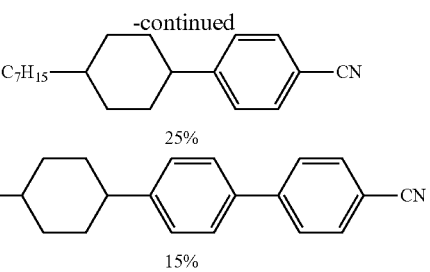

Measurement Methods

The characteristics of compounds were measured according to the following methods. Most are methods described in the JEITA standards (JEITA-ED-2521B) which was deliberated and established by Japan Electronics and Information Technology Industries Association (abbreviated to JEITA), or the modified methods. No thin film transistors (TFT) were attached to a TN device used for measurement.

(1) Maximum Temperature of a Nematic Phase (NI; ° C.): A sample was placed on a hot plate in a melting point apparatus equipped with a polarizing microscope and was heated at the rate of 1° t per minute. The temperature was measured when part of the sample began to change from a nematic phase to an isotropic liquid.

(2) Minimum Temperature of a Nematic Phase (Tc; ° C.): A sample having a nematic phase was placed in glass vials and then kept in freezers at temperatures of 0° C., −10° C., −20° C., −30° C. and −40° C. for 10 days, and then the liquid crystal phases were observed. For example, when the sample maintained the nematic phase at −20° C. and changed to crystals or a smectic phase at −30° C., Tc was expressed as <−20° C.

(3) Viscosity (bulk viscosity; η; measured at 20° C.; mPa·s): An E-type viscometer made by Tokyo Keiki Inc. was used for measurement.

(4) Viscosity (rotational viscosity; γ1; measured at 25° C.; mPa·s): The measurement was carried out according to the method described in M. Imai, et al., Molecular Crystals and Liquid Crystals, Vol. 259, 37 (1995). A sample was poured into a TN device in which the twist angle was 0 degrees and the distance between the two glass substrates (cell gap) was 5 micrometers. A voltage was applied to this device and increased stepwise with an increment of 0.5 volt in the range of 16 to 19.5 volts. After a period of 0.2 second with no voltage, a voltage was applied repeatedly under the conditions of a single rectangular wave alone (rectangular pulse; 0.2 second) and of no voltage (2 seconds). The peak current and the peak time of the transient current generated by the applied voltage were measured. The value of rotational viscosity was obtained from these measured values and the calculating equation (8) on page 40 of the paper presented by M. Imai, et al. The value of dielectric anisotropy necessary for this calculation was obtained by use of the device that had been used for the measurement of rotational viscosity, according to the method that will be described below.

(5) Optical anisotropy (refractive index anisotropy; Δn; measured at 25° C.): The measurement was carried out using an Abbe refractometer with a polarizing plate attached to the ocular, using light at a wavelength of 589 nanometers. The surface of the main prism was rubbed in one direction, and then a sample was placed on the main prism. The refractive index (n∥) was measured when the direction of the polarized light was parallel to that of rubbing. The refractive index (n⊥) was measured when the direction of polarized light was perpendicular to that of rubbing. The value of the optical anisotropy (Δn) was calculated from the equation: Δn=n∥−n⊥.

(6) Dielectric anisotropy (Δε; measured at 25° C.): A sample was poured into a TN device in which the distance between the two glass substrates (cell gap) was 9 micrometers and the twist angle was 80 degrees. Sine waves (10 V, 1 kHz) were applied to this device, and the dielectric constant (ε∥) in the major axis direction of liquid crystal molecules was measured after 2 seconds. Sine waves (0.5 V, 1 kHz) were applied to this device and the dielectric constant (ε⊥) in the minor axis direction of the liquid crystal molecules was measured after 2 seconds. The value of dielectric anisotropy was calculated from the equation: Δε=ε∥−ε⊥.

(7) Threshold voltage (Vth; measured at 25° C.; V): An LCD evaluation system Model LCD-5100 made by Otsuka Electronics Co., Ltd. was used for measurement. The light source was a halogen lamp. A sample was poured into a TN device having a normally white mode, in which the distance between the two glass substrates (cell gap) was 4.45/Δn (micrometers) and the twist angle was 80 degrees. A voltage to be applied to this device (32 Hz, rectangular waves) was stepwise increased in 0.02 V increments from 0 V up to 10 V. During the increase, the device was irradiated with light in the perpendicular direction, and the amount of light passing through the device was measured. A voltage-transmittance curve was prepared, in which the maximum amount of light corresponded to 100% transmittance and the minimum amount of light corresponded to 0% transmittance. The threshold voltage was expressed as voltage at 90% transmittance.

(8) Voltage Holding Ratio (VHR-1; measured at 25° C.; %): A TN device used for measurement had a polyimide-alignment film, and the distance between the two glass substrates (cell gap) was 5 micrometers. A sample was poured into the device, and then this device was sealed with a UV-curable adhesive. A pulse voltage (60 microseconds at 5 V) was applied to this device and the device was charged. A decreasing voltage was measured for 16.7 milliseconds with a high-speed voltmeter, and area A between the voltage curve and the horizontal axis in a unit cycle was obtained. Area B was an area without the decrease. The voltage holding ratio was expressed as a percentage of area A to area B.

(9) Voltage Holding Ratio (VHR-2; measured at 80° C.; %): The voltage holding ratio was measured by the method described above, except that it was measured at 80° C. instead of 25° C. The resulting values were represented by the symbol VHR-2.

(10) Voltage Holding Ratio (VHR-3; measured at 25° C.; %): The stability to ultraviolet light was evaluated by measuring a voltage holding ratio after irradiation with ultraviolet light. A TN device used for measurement had a polyimide-alignment film and the cell gap was 5 micrometers. A sample was poured into this device, and then the device was irradiated with light for 20 minutes. The light source was an ultra-high-pressure mercury lamp USH-500D (produced by Ushio, Inc.), and the distance between the device and the light source was 20 centimeters. In the measurement of VHR-3, a decreasing voltage was measured for 16.7 milliseconds. A composition having a large VHR-3 has a high stability to ultraviolet light. The value of VHR-3 is preferably 90% or more, and more preferably 95% or more.

(11) Voltage Holding Ratio (VHR-4; measured at 25° C.; %): A TN device into which a sample was poured was heated in a constant-temperature bath at 80° C. for 500 hours, and then the stability to heat was evaluated by measuring the voltage holding ratio. In the measurement of VHR-4, a decreasing voltage was measured for 16.7 milliseconds. A composition having a large VHR-4 has a high stability to heat.

(12) Response Time (τ; measured at 25° C.; millisecond): An LCD evaluation system Model LCD-5100 made by Otsuka Electronics Co., Ltd. was used for measurement. The light source was a halogen lamp. The low-pass filter was set at 5 kHz. A sample was poured into a TN device having a normally white mode, in which the distance between the two glass substrates (cell gap) was 5.0 micrometers and the twist angle was 80 degrees. Rectangular waves (60 Hz, 5 V, 0.5 second) were applied to this device. The device was simultaneously irradiated with light in the perpendicular direction, and the amount of light passing through the device was measured. The transmittance was regarded as 100% when the amount of light reached a maximum. The transmittance was regarded as 0% when the amount of light reached a minimum. Rise time (τr; millisecond) was the time required for a change from 90% to 10% transmittance. Fall time (τf; millisecond) was the time required for a change from 10% to 90% transmittance. The response time was expressed as the sum of the rise time and the fall time thus obtained.

(13) Elastic constants (K; measured at 25° C.; pN): A LCR meter Model HP 4284-A made by Yokokawa Hewlett-Packard, Ltd. was used for measurement. A sample was poured into a homogeneous device in which the distance between the two glass substrates (cell gap) was 20 micrometers. An electric charge of 0 volts to 20 volts was applied to this device, and the electrostatic capacity and the applied voltage were measured. The measured values of the electric capacity (C) and the applied voltage (V) were fitted to equation (2.98) and equation (2.101) on page 75 of "Ekisho Debaisu Handobukku" (Liquid Crystal Device Handbook, in English; The Nikkan Kogyo Shimbun, Ltd., Japan) and the values of K11 and K33 were obtained from equation (2.99). Next, the value of K22 was calculated from equation (3.18) on page 171 of the book and the values of K11 and K33 thus obtained. The elastic constant K was expressed as an average value of K11, K22 and K33.

(14) Specific Resistance (ρ; measured at 25° C.; Ωcm): A sample of 1.0 milliliter was poured into a vessel equipped with electrodes. A DC voltage (10 V) was applied to the vessel, and the DC current was measured after 10 seconds. The specific resistance was calculated from the following equation. (specific resistance)=[(voltage)×(electric capacity of vessel)]/[(DC current)×(dielectric constant in vacuum)].

(15) Helical pitch (P; measured at room temperature; micrometer): The helical pitch was measured according to the wedge method (see page 196 of "Ekishou Binran" (Liquid Crystal Handbook, in English; Maruzen, Co., LTD., Japan, 2000). After a sample had been injected into a wedge-shaped cell and the cell had been allowed to stand at room temperature for 2 hours, the distance (d2−d1) between disclination lines was observed with a polarizing microscope (Nikon Corporation, Model MM-40/60 series). The helical pitch (P) was calculated from the following equation, wherein θ was defined as the angle of the wedge cell: P=2×(d2−d1)×tan θ.

(16) Dielectric constant in the minor axis direction (ε⊥; measured at 25° C.): A sample was poured into a TN device in which the distance between the two glass substrates (cell gap) was 9 micrometers and the twist angle was 80 degrees. Sine waves (0.5 V, 1 kHz) were applied to this device and the dielectric constant (ε⊥) in the minor axis direction of the liquid crystal molecules was measured after 2 seconds.

The compounds described in Examples were expressed in terms of symbols according to the definition in Table 3 described below. In Table 3, the configuration of 1,4-cyclohexylene is trans. The parenthesized number next to a symbolized compound in Example indicates the number of the compound. The symbol (−) means any other liquid crystal compound. The ratio (percentage) of a liquid crystal compound means the percentages by weight (% by weight) based on the liquid crystal composition. Last, the values of characteristics of the composition are summarized.

TABLE 3

Method of the Description of Compounds using Symbols
R—(A₁)—Z₁—•••••—Zₙ—(Aₙ)—R'

| 1) Left-terminal Group R— | Symbol |
|---|---|
| $C_nH_{2n+1}$— | n- |
| $C_nH_{2n+1}O$— | nO— |
| $C_mH_{2m+1}OC_nH_{2n}$— | mOn- |
| $CH_2$=CH— | V— |
| $C_nH_{2n+1}$—CH=CH— | nV— |
| $CH_2$=CH—$C_nH_{2n}$— | Vn- |
| $C_mH_{2m+1}$—CH=CH—$C_nH_{2n}$— | mVn- |
| $CF_2$=CH— | VFF— |
| $CF_2$=CH—$C_nH_{2n}$— | VFFn- |

| 2) Right-terminal Group —R' | Symbol |
|---|---|
| —$C_nH_{2n+1}$ | -n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | -nV |
| —$C_nH_{2n}$—CH=CH—$C_mH_{2m+1}$ | -nVm |
| —CH=$CF_2$ | —VFF |
| —$COOCH_3$ | -EMe |
| —F | —F |
| —Cl | —CL |
| —$OCF_3$ | —OCF3 |
| —$CF_3$ | —$CF_3$ |
| —CN | —C |
| —OCH=CH—$CF_2H$ | —OVCF2H |
| —OCH=CH—$CF_3$ | —OVCF3 |

| 3) Bonding Group —$Z_n$— | Symbol |
|---|---|
| —$C_2H_4$— | 2 |
| —COO— | E |
| —CH=CH— | V |
| —C≡C— | T |
| —$CF_2O$— | X |
| —$CH_2O$— | 1O |

| 4) Ring Structure —$A_n$— | Symbol |
|---|---|
|  | H |
| 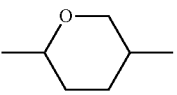 | Dh |
| 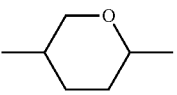 | dh |
|  | B |
| 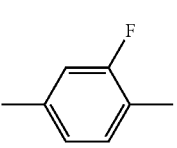 | B(F) |

TABLE 3-continued

Method of the Description of Compounds using Symbols
R—(A₁)—Z₁—•••••—Zₙ—(Aₙ)—R'

| | |
|---|---|
| 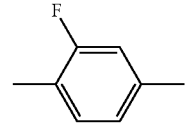 | B(2F) |
| 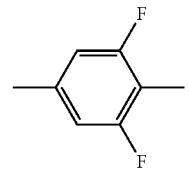 | B(F,F) |
| 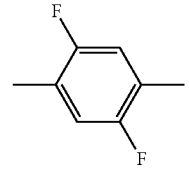 | B(2F,5F) |
| 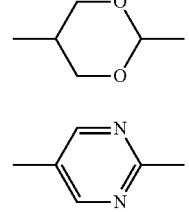 | G |
| 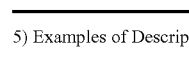 | Py |

5) Examples of Description

Example 1.  3-HH-V1

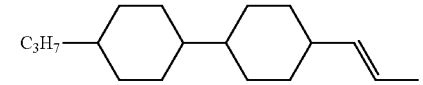

Example 2.  3-BB(F)B(F,F)—F

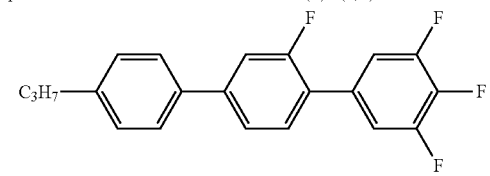

Example 3.  4-BB(F)B(F,F)XB(F,F)—F

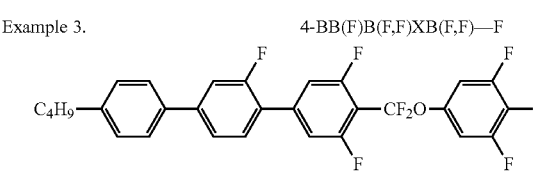

Example 4.  5-GB(F,F)XB(F)—OVCF3

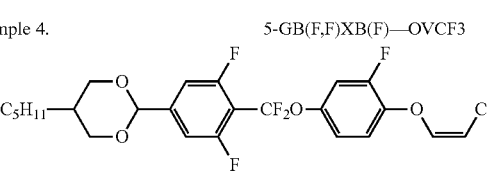

Example 1

| | | |
|---|---|---|
| 5-HXB(F,F)-OVCF3 | (1-1) | 7% |
| 3-BB(F,F)XB(F,F)-OVCF3 | (1-4) | 3% |
| 5-HHB(F,F)XB(F,F)-OVCF3 | (1-5) | 3% |
| 3-GB(F)B(F,F)-OVCF3 | (1-13) | 3% |
| 3-HH-V | (2) | 38% |
| 7-HB-1 | (3-1) | 3% |
| V-HHB-1 | (3-4) | 7% |
| 5-HBB(F)B-2 | (3-12) | 4% |
| 3-HHB(F,F)-F | (4-3) | 3% |
| 3-BBXB(F,F)-F | (4-15) | 5% |
| 3-HBB(F,F)XB(F,F)-F | (4-21) | 5% |
| 5-HBB(F,F)XB(F,F)-F | (4-21) | 7% |
| 3-BB(F)B(F,F)XB(F,F)-F | (4-25) | 3% |
| 4-BB(F)B(F,F)XB(F,F)-F | (4-25) | 9% |

NI = 70.9° C.; Tc < −20° C.; Δn = 0.099; Δ∈ = 9.7; Vth = 1.47 V; η = 12.1 mPa · s; γ1 = 78.6 mPa · s; τ = 9.8 ms.

Comparative Example 1

The composition in Example 1 comprises compound (1) that is the first component. Compound (1) has positive dielectric anisotropy. Compound (4) also has positive dielectric anisotropy. For comparison, four compounds of the first component in Example 1 were replaced by four of compound (4), which were similar to them, respectively, and thus the composition was prepared as Comparative example 1.

| | | |
|---|---|---|
| 5-HXB(F,F)-F | (4-2) | 7% |
| 3-BB(F,F)XB(F,F)-F | (4-16) | 3% |
| 5-HHB(F,F)XB(F,F)-F | (4) | 3% |
| 3-GB(F)B(F,F)-F | (4-11) | 3% |
| 3-HH-V | (2) | 38% |
| 7-HB-1 | (3-1) | 3% |
| V-HHB-1 | (3-4) | 7% |
| 5-HBB(F)B-2 | (3-12) | 4% |
| 3-HHB(F,F)-F | (4-3) | 3% |
| 3-BBXB(F,F)-F | (4-15) | 5% |
| 3-HBB(F,F)XB(F,F)-F | (4-21) | 5% |
| 5-HBB(F,F)XB(F,F)-F | (4-21) | 7% |
| 3-BB(F)B(F,F)XB(F,F)-F | (4-25) | 3% |
| 4-BB(F)B(F,F)XB(F,F)-F | (4-25) | 9% |

NI = 71.4° C.; Tc < −20° C.; Δn = 0.099; Δ∈ = 8.8; Vth = 1.55 V; η = 10.2 mPa · s.

Example 2

| | | |
|---|---|---|
| 3-HHXB(F,F)-OVCF3 | (1-2) | 5% |
| 3-GB(F,F)XB(F,F)-OVCF3 | (1-3) | 5% |
| 4-BB(F)B(F,F)XB(F,F)-OVCF2H | (1-9) | 3% |
| 3-HH-V | (2) | 20% |
| 3-HH-V1 | (2) | 10% |
| 1V2-HH-1 | (2) | 12% |
| V2-HHB-1 | (3-4) | 6% |
| 3-GB(F,F)XB(F,F)-F | (4-12) | 5% |
| 3-BB(F)B(F,F)-CF3 | (4-14) | 3% |
| 3-HBBXB(F,F)-F | (4-20) | 7% |
| 4-GB(F)B(F,F)XB(F,F)-F | (4-23) | 6% |
| 3-BB(F)B(F,F)XB(F)-F | (4-24) | 3% |
| 3-BB(F)B(F,F)XB(F,F)-F | (4-25) | 3% |
| 4-BB(F)B(F,F)XB(F,F)-F | (4-25) | 9% |
| 5-BB(F)B(F,F)XB(F)B(F,F)-F | (4-27) | 3% |

NI = 75.4° C.; Tc < −20° C.; Δn = 0.110; Δ∈ = 14.1; Vth = 1.28 V; η = 18.9 mPa · s; γ1 = 121.5 mPa · s; τ = 11.7 ms.

Example 3

| | | |
|---|---|---|
| 3-BBXB(F,F)-OVCF3 | (1-4) | 5% |
| 3-HBB(F,F)XB(F,F)-OVCF3 | (1-6) | 5% |
| 3-BB(F,F)XB(F)B(F,F)-OVCF3 | (1-10) | 6% |
| 5-HH-V | (2) | 37% |
| 1-BB(F)B-2V | (3-6) | 5% |
| 3-BB(F)B-2V | (3-6) | 5% |
| 3-HB-CL | (4-1) | 4% |
| 3-HHXB(F,F)-F | (4-5) | 4% |
| 3-BB(F,F)XB(F)-F | (4-16) | 6% |
| 5-GBB(F)B(F,F)-F | (4-19) | 5% |
| 3-BB(F)B(F,F)XB(F)-F | (4-24) | 5% |
| 4-BB(F)B(F,F)XB(F)-F | (4-24) | 3% |
| 3-BB(F)XB(F)B(F,F)-F | (4-26) | 7% |
| 5-BB(F)B(F,F)XB(F)B(F,F)-F | (4-27) | 3% |

NI = 77.6° C.; Tc < −20° C.; Δn = 0.132; Δ∈ = 13.1; Vth = 1.31 V; η = 24.9 mPa · s; γ1 = 161.7 mPa · s; τ = 13.5 ms.

Example 4

| | | |
|---|---|---|
| 3-HBB(F,F)XB(F)-OVCF3 | (1-6) | 3% |
| 3-HBB(F,F)-OVCF3 | (1-12) | 5% |
| 3-HH-V | (2) | 38% |
| 3-HH-V1 | (2) | 3% |
| 3-HH-VFF | (2) | 4% |
| V2-BB-1 | (3-2) | 3% |
| 1-BB-3 | (3-2) | 3% |
| 1V-HBB-2 | (3-5) | 4% |
| 2-BB(F)B-3 | (3-6) | 3% |
| 5-HBB(F)B-3 | (3-12) | 3% |
| 5-HXB(F,F)-F | (4-2) | 3% |
| 5-HHBB(F,F)-F | (4-17) | 5% |
| 3-HBB(F,F)XB(F,F)-F | (4-21) | 5% |
| 5-GB(F)B(F,F)XB(F,F)-F | (4-23) | 3% |
| 5-GB(F)B(F,F)XB(F,F)-F | (4-23) | 3% |
| 4-BB(F)B(F,F)XB(F,F)-F | (4-25) | 8% |
| 5-BB(F)B(F,F)XB(F,F)-F | (4-25) | 4% |

NI = 77.7° C.; Tc < −20° C.; Δn = 0.112; Δ∈ = 8.0; Vth = 1.58 V; η = 9.7 mPa · s; γ1 = 62.3 mPa · s; τ = 9.1 ms.

Example 5

| | | |
|---|---|---|
| 3-dhBB(F,F)XB(F,F)-OVCF3 | (1-7) | 3% |
| 3-GB(F)B(F,F)XB(F,F)-OVCF3 | (1-8) | 3% |
| 3-HH-V | (2) | 38% |
| 1V2-HH-3 | (2) | 5% |
| V-HHB-1 | (3-4) | 3% |
| 1-BB(F)B-2V | (3-6) | 5% |
| 5-HB(F)BH-3 | (3-11) | 7% |
| 5-HGB(F)-F | (4-6) | 3% |
| 3-GHB(F,F)-F | (4-7) | 7% |
| 3-HBEB(F,F)-F | (4-10) | 3% |
| 3-BB(F,F)XB(F,F)-F | (4-16) | 8% |
| 3-HBBXB(F,F)-F | (4-20) | 5% |
| 4-GB(F)B(F,F)XB(F,F)-F | (4-23) | 4% |
| 5-GB(F)B(F,F)XB(F,F)-F | (4-23) | 3% |
| 3-HH-O1 | (—) | 3% |

NI = 79.3° C.; Tc < −20° C.; Δn = 0.098; Δ∈ = 9.1; Vth = 1.49 V; η = 12.2 mPa · s; γ1 = 79.4 mPa · s; τ = 9.9 ms.

Example 6

| | | |
|---|---|---|
| 5-HXB-OVCF3 | (1-1) | 3% |
| 5-HXB(F,F)-OVCF3 | (1-1) | 3% |
| 4-BB(F)B(F,F)XB(F,F)-OVCF3 | (1-9) | 3% |

-continued

| | | |
|---|---|---|
| 3-BB(F)B(F,F)-OVCF3 | (1-14) | 4% |
| 5-HH-V | (2) | 25% |
| 3-HH-V1 | (2) | 10% |
| 1V2-HH-3 | (2) | 5% |
| 3-HB-O2 | (3-1) | 3% |
| 1-BB(F)B-2V | (3-6) | 4% |
| 5-B(F)BB-2 | (3-7) | 3% |
| 3-HHXB(F,F)-F | (4-5) | 5% |
| 3-BB(F)B(F,F)-F | (4-13) | 4% |
| 3-HBBXB(F,F)-F | (4-20) | 12% |
| 4-BB(F)B(F,F)XB(F,F)-F | (4-25) | 8% |
| 3-BB(F,F)XB(F)B(F,F)-F | (4-26) | 8% |

NI = 79.9° C.; Tc < −20° C.; Δn = 0.121; Δ∈ = 10.0; Vth = 1.45 V; η = 13.7 mPa · s; γ1 = 89.3 mPa · s; τ = 10.7 ms.

Example 7

| | | |
|---|---|---|
| 3-HHXB(F,F)-OVCF3 | (1-2) | 5% |
| 4-BB(F)B(F,F)XB(F,F)-OVCF3 | (1-9) | 3% |
| 3-BB(F)XB(F)B(F,F)-OVCF3 | (1-10) | 5% |
| 3-HH-V | (2) | 32% |
| 4-HH-V1 | (2) | 8% |
| 4-HHEH-3 | (3-3) | 3% |
| VFF-HHB-1 | (3-4) | 2% |
| 3-HB(F)HH-2 | (3-8) | 5% |
| 3-HHEB(F,F)-F | (4-4) | 5% |
| 3-BB(F)B(F,F)-CF3 | (4-14) | 4% |
| 3-BB(F)XB(F,F)-F | (4-16) | 5% |
| 3-HHBB(F,F)-F | (4-17) | 3% |
| 5-GBB(F)B(F,F)-F | (4-19) | 3% |
| 3-HBBXB(F,F)-F | (4-20) | 5% |
| 4-GB(F)B(F,F)XB(F,F)-F | (4-23) | 6% |
| 5-GB(F)B(F,F)XB(F,F)-F | (4-23) | 4% |
| 2-HH-3 | (—) | 2% |

NI = 86.5° C.; Tc < −20° C.; Δn = 0.100; Δ∈ = 11.2; Vth = 1.39 V; η = 21.9 mPa · s; γ1 = 142.1 mPa · s; τ = 12.3 ms.

Example 8

| | | |
|---|---|---|
| 5-HHB(F,F)XB(F,F)-OVCF3 | (1-5) | 3% |
| 3-GB(F)B(F,F)XB(F,F)-OVCF3 | (1-8) | 5% |
| 3-HBB(F,F)-OVCF3 | (1-12) | 5% |
| 3-HH-V | (2) | 33% |
| V2-BB-1 | (3-2) | 6% |
| 3-HHB-1 | (3-4) | 5% |
| 5-HBBH-3 | (3-10) | 3% |
| 3-HBB(F,F)-F | (4-8) | 3% |
| 5-HBB(F,F)-F | (4-8) | 4% |
| 3-GB(F,F)XB(F,F)-F | (4-12) | 9% |
| 3-BB(F)B(F,F)-CF3 | (4-14) | 4% |
| 3-HBBXB(F,F)-F | (4-20) | 5% |
| 5-HBBXB(F,F)-F | (4-20) | 4% |
| 4-GB(F)B(F,F)XB(F,F)-F | (4-23) | 5% |
| 4-BB(F)B(F,F)XB(F,F)-F | (4-25) | 6% |

NI = 72.4° C.; Tc < −20° C.; Δn = 0.106; Δ∈ = 12.4; Vth = 1.35 V; η = 18.6 mPa · s; γ1 = 120.5 mPa · s; τ = 11.5 ms.

Example 9

| | | |
|---|---|---|
| 3-BBXB(F,F)-OVCF3 | (1-4) | 5% |
| 3-BB(F,F)XB(F,F)-OVCF3 | (1-4) | 3% |
| 3-GB(F)B(F,F)XB(F,F)-OVCF3 | (1-8) | 3% |
| 3-HH-V | (2) | 35% |
| 1V2-BB-1 | (3-2) | 6% |
| 3-HHEH-3 | (3-3) | 3% |
| 3-HB(F)HH-2 | (3-8) | 3% |
| 3-HHEBH-3 | (3-9) | 3% |
| 5-HB(F)BH-3 | (3-11) | 3% |
| 3-HGB(F,F)-F | (4-6) | 4% |
| 5-GHB(F,F)-F | (4-7) | 4% |
| 3-HBB(F,F)-F | (4-8) | 3% |
| 3-BBXB(F,F)-F | (4-15) | 7% |
| 3-BB(F,F)XB(F,F)-F | (4-16) | 5% |
| 3-HBB(F,F)XB(F,F)-F | (4-21) | 3% |
| 4-BB(F)B(F,F)XB(F,F)-F | (4-25) | 3% |
| 3-BB(F,F)XB(F)B(F,F)-F | (4-26) | 4% |
| 5-BB(F)B(F,F)XB(F)B(F,F)-F | (4-27) | 3% |

NI = 71.9° C.; Tc < −20° C.; Δn = 0.106; Δ∈ = 10.9; Vth = 1.41 V; η = 13.8 mPa · s; γ1 = 89.0 mPa · s; τ = 10.6 ms.

Example 10

| | | |
|---|---|---|
| 3-HBB(F,F)XB(F,F)-OVCF3 | (1-6) | 3% |
| 3-GB(F)B(F,F)XB(F,F)-OVCF3 | (1-8) | 5% |
| 5-HH-V | (2) | 35% |
| 3-HH-V1 | (2) | 6% |
| 1V2-HH-3 | (2) | 4% |
| 1-BB(F)B-2V | (3-6) | 5% |
| 2-BB(F)B-2V | (3-6) | 4% |
| 3-HB(F)HH-2 | (3-8) | 3% |
| 3-HHEBH-3 | (3-9) | 3% |
| 5-HB-CL | (4-1) | 4% |
| 4-HHEB(F,F)-F | (4-4) | 3% |
| 3-BBXB(F,F)-F | (4-15) | 4% |
| 3-GB(F)B(F,F)XB(F,F)-F | (4-23) | 3% |
| 4-GB(F)B(F,F)XB(F,F)-F | (4-23) | 5% |
| 3-BB(F,F)XB(F)B(F,F)-F | (4-26) | 7% |
| 1O1-HBBH-3 | (—) | 3% |
| 1O1-HBBH-5 | (—) | 3% |

NI = 97.6° C.; Tc < −20° C.; Δn = 0.114; Δ∈ = 9.2; Vth = 1.50 V; η = 14.0 mPa · s; γ1 = 90.7 mPa · s; τ = 10.8 ms.

Example 11

| | | |
|---|---|---|
| 5-HHB(F,F)XB(F,F)-OVCF3 | (1-5) | 3% |
| 3-dhBB(F,F)XB(F,F)-OVCF3 | (1-7) | 3% |
| 3-HH-V | (2) | 38% |
| 7-HB-1 | (3-1) | 3% |
| V-HHB-1 | (3-4) | 7% |
| 5-HBB(F)B-2 | (3-12) | 4% |
| 3-HHB(F,F)-F | (4-3) | 3% |
| 3-HB(F)B(F,F)-F | (4-9) | 3% |
| 3-GB(F)B(F,F)-F | (4-11) | 3% |
| 3-BBXB(F,F)-F | (4-15) | 5% |
| 4-HHB(F)B(F,F)-F | (4-18) | 5% |
| 3-HBB(F,F)XB(F,F)-F | (4-21) | 3% |
| 5-HBB(F,F)XB(F,F)-F | (4-21) | 7% |
| 3-dhBB(F,F)XB(F,F)-F | (4-22) | 4% |
| 4-BB(F)B(F,F)XB(F,F)-F | (4-25) | 9% |

NI = 84.8° C.; Tc < −20° C.; Δn = 0.107; Δ∈ = 9.7; Vth = 1.46 V; η = 16.4 mPa · s; γ1 = 106.6 mPa · s; τ = 11.0 ms.

Example 12

| | | |
|---|---|---|
| 3-HBB(F,F)XB(F,F)-OVCF2H | (1-6) | 3% |
| 3-HBB(F,F)-OVCF2H | (1-12) | 5% |
| 3-HH-V | (2) | 38% |
| 3-HH-V1 | (2) | 3% |
| 3-HH-VFF | (2) | 4% |
| V2-BB-1 | (3-2) | 3% |
| 1-BB-3 | (3-2) | 3% |
| V-HBB-2 | (3-5) | 4% |

-continued

| | | |
|---|---|---|
| 2-BB(F)B-3 | (3-6) | 3% |
| 5-HBB(F)B-3 | (3-12) | 3% |
| 5-HXB(F,F)-F | (4-2) | 3% |
| 5-HHBB(F,F)-F | (4-17) | 5% |
| 3-HBB(F,F)XB(F,F)-F | (4-21) | 5% |
| 5-GB(F)B(F,F)XB(F,F)-F | (4-23) | 3% |
| 5-GB(F)B(F,F)XB(F,F)-F | (4-23) | 3% |
| 4-BB(F)B(F,F)XB(F,F)-F | (4-25) | 8% |
| 5-BB(F)B(F,F)XB(F,F)-F | (4-25) | 4% |

NI = 78.7° C.; Tc < −20° C.; Δn = 0.112; Δ∈ = 8.3; Vth = 1.55 V; η = 12.0 mPa · s; γ1 = 77.7 mPa · s; τ = 9.7 ms.

The dielectric anisotropy (80 of the composition in Comparative example 1 was 8.8. In contrast, the dielectric anisotropy of the composition in Example 1 was 9.7. The composition in Example had a large dielectric anisotropy in comparison with the composition in Comparative example, as is shown here. It is thus concluded that the liquid crystal composition of the invention has excellent characteristics.

INDUSTRIAL APPLICABILITY

The liquid crystal composition of the invention satisfies at least one of characteristics such as a high maximum temperature, a low minimum temperature, a small viscosity, a suitable optical anisotropy, a large dielectric anisotropy, a large specific resistance, a high stability to ultraviolet light, a high stability to heat and a large elastic constant, or is suitably balanced between at least two of the characteristics. A liquid crystal display device comprising this composition can be used for a liquid crystal projector, a liquid crystal television and so forth, since it has a short response time, a large voltage holding ratio, a low threshold voltage, a large contrast ratio and a long service life.

What is claimed is:

1. A liquid crystal composition having a nematic phase and comprising at least one compound selected from the group of compounds represented by formula (1) as a first component and at least one compound selected from the group of compounds represented by formula (2) as a second component:

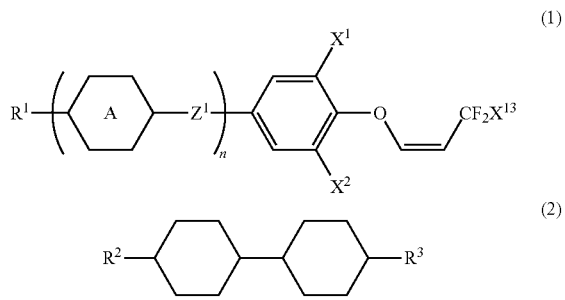

in formula (1) and formula (2), $R^1$ and $R^2$ are independently alkyl having 1 to 12 carbons, alkoxy having 1 to 12 carbons or alkenyl having 2 to 12 carbons; $R^3$ is alkenyl having 2 to 12 carbons or alkenyl having 2 to 12 carbons in which at least one hydrogen has been replaced by fluorine; ring A is 1,4-cyclohexylene, 1,4-phenylene, 2-fluoro-1,4-phenylene, 2,6-difluoro-1,4-phenylene, pyrimidine-2,5-diyl, 1,3-dioxane-2,5-diyl or tetrahydropyran-2,5-diyl; $Z^1$ is a single bond, ethylene, vinylene, methyleneoxy, carbonyloxy or difluoromethyleneoxy; $X^1$, $X^2$ and $X^{13}$ are independently hydrogen or fluorine; and n is 1, 2, 3 or 4.

2. The liquid crystal composition according to claim 1, comprising at least one compound selected from the group of compounds represented by formula (1-1) to formula (1-14) as the first component:

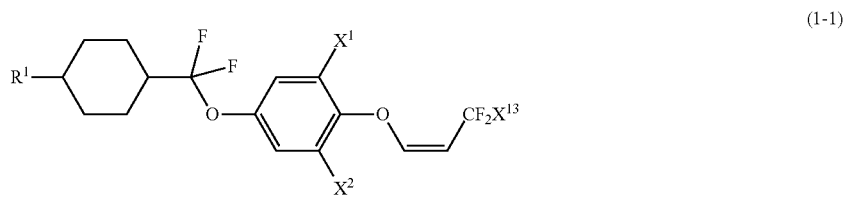

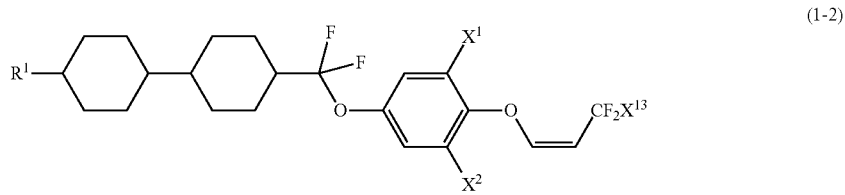

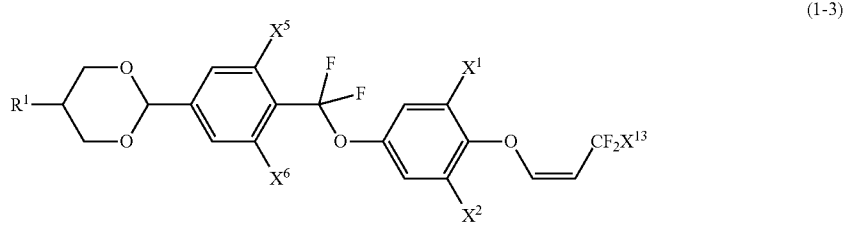

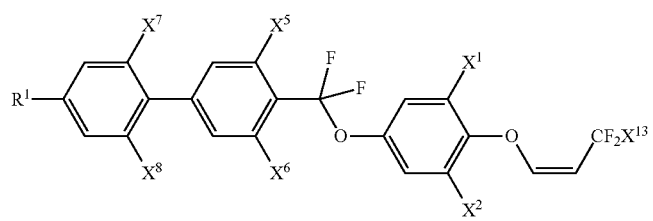
(1-4)
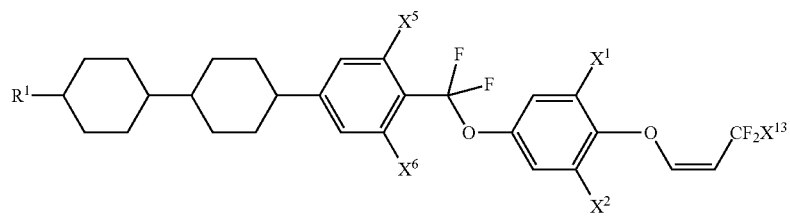
(1-5)
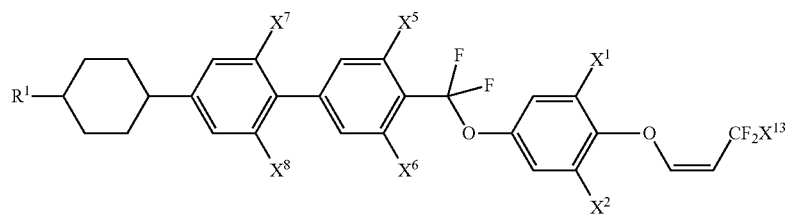
(1-6)
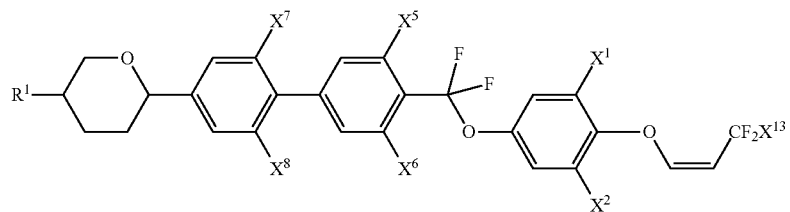
(1-7)
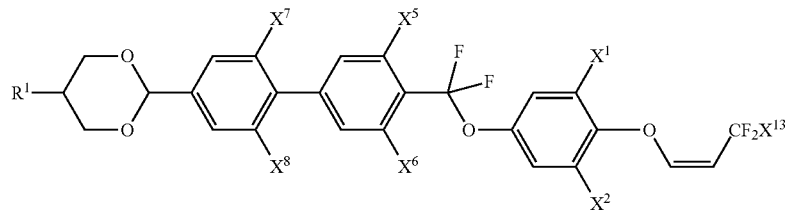
(1-8)
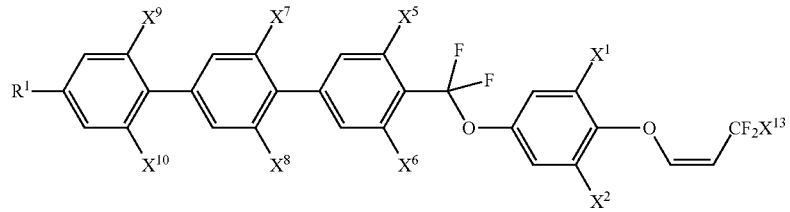
(1-9)
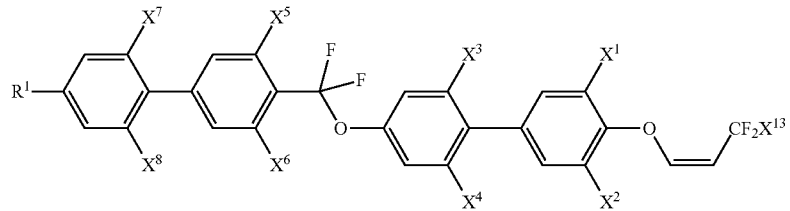
(1-10)

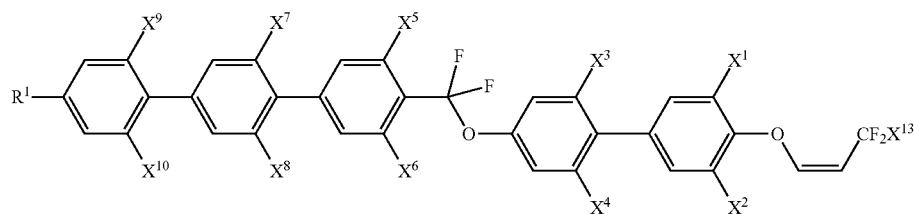
(1-11)

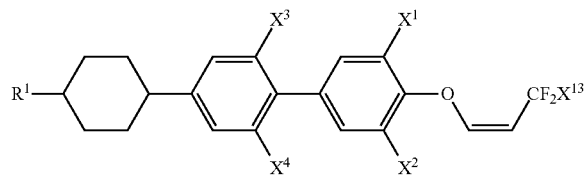
(1-12)

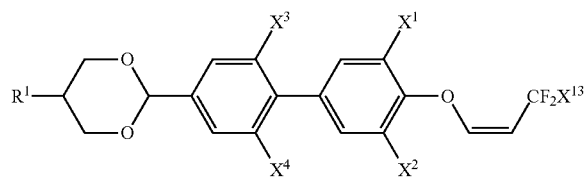
(1-13)

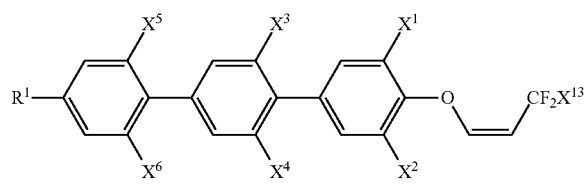
(1-14)

in formula (1-1) to formula (1-14), $R^1$ is alkyl having 1 to 12 carbons, alkoxy having 1 to 12 carbons or alkenyl having 2 to 12 carbons; and $X^1, X^2, X^3, X^4, X^5, X^6, X^7, X^8, X^8, X^{10}$ and $X^{13}$ are independently hydrogen or fluorine.

3. The liquid crystal composition according to claim 1, wherein a ratio of the first component is in the range of 5% by weight to 35% by weight and a ratio of the second component is in the range of 10% by weight to 70% by weight based on the weight of the liquid crystal composition.

4. The liquid crystal composition according to claim 1, further comprising at least one compound selected from the group of compounds represented by formula (3) as a third component:

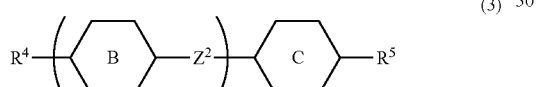
(3)

in formula (3), $R^4$ and $R^5$ are independently alkyl having 1 to 12 carbons, alkoxy having 1 to 12 carbons, alkenyl having 2 to 12 carbons or alkenyl having 2 to 12 carbons in which at least one hydrogen has been replaced by fluorine; ring B and ring C are independently 1,4-cyclohexylene, 1,4-phenylene, 2-fluoro-1,4-phenylene or 2,5-difluoro-1,4-phenylene; $Z^2$ is a single bond, ethylene or carbonyloxy; m is 1, 2 or 3; and ring C is 1,4-phenylene when m is 1.

5. The liquid crystal composition according to claim 1, comprising at least one compound selected from the group of compounds represented by formula (3-1) to formula (3-12) as a third component:

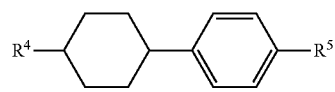
(3-1)

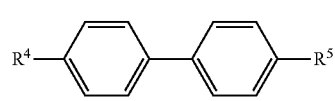
(3-2)

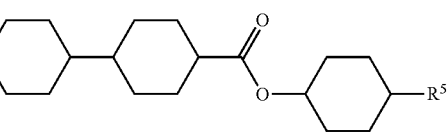
(3-3)

(3-4)

(3-5)

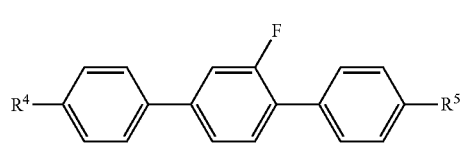
(3-6)

-continued

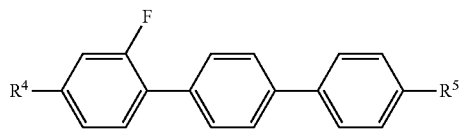
(3-7)

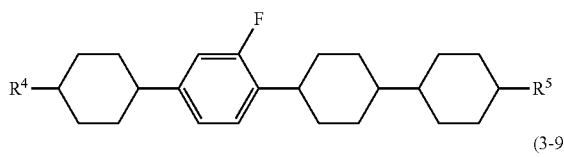
(3-8)

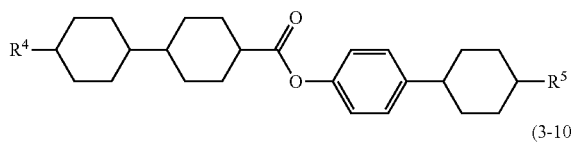
(3-9)

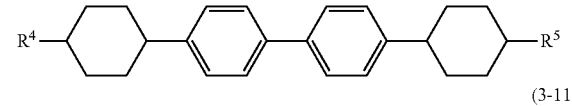
(3-10)

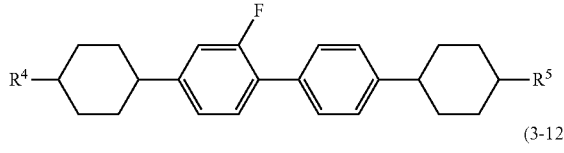
(3-11)

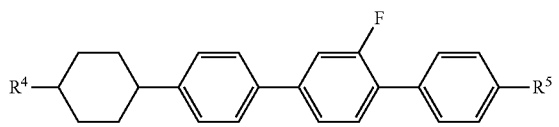
(3-12)

in formula (3-1) to formula (3-12), $R^4$ and $R^5$ are independently alkyl having 1 to 12 carbons, alkoxy having 1 to 12 carbons, alkenyl having 2 to 12 carbons or alkenyl having 2 to 12 carbons in which at least one hydrogen has been replaced by fluorine.

6. The liquid crystal composition according to claim 4, wherein a ratio of the third component is in the range of 5% by weight to 50% by weight based on the weight of the liquid crystal composition.

7. The liquid crystal composition according to claim 1, further comprising at least one compound selected from the group of compounds represented by formula (4) as a fourth component:

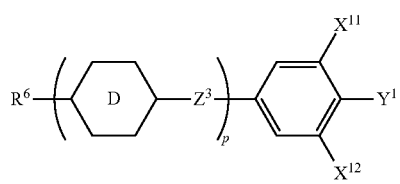
(4)

in formula (4), $R^6$ is alkyl having 1 to 12 carbons, alkoxy having 1 to 12 carbons or alkenyl having 2 to 12 carbons; ring D is 1,4-cyclohexylene, 1,4-phenylene, 2-fluoro-1,4-phenylene, 2,6-difluoro-1,4-phenylene, pyrimidine-2,5-diyl, 1,3-dioxane-2,5-diyl or tetrahydropyran-2,5-diyl; $Z^3$ is a single bond, ethylene, carbonyloxy or difluoromethyleneoxy; $X^1$ and $X^{12}$ are independently hydrogen or fluorine; $Y^1$ is fluorine, chlorine, alkyl having 1 to 12 carbons in which at least one hydrogen has been replaced by halogen or alkoxy having 1 to 12 carbons in which at least one hydrogen has been replaced by halogen; and p is 1, 2, 3 or 4.

8. The liquid crystal composition according to claim 4, further comprising at least one compound selected from the group of compounds represented by formula (4) as a fourth component:

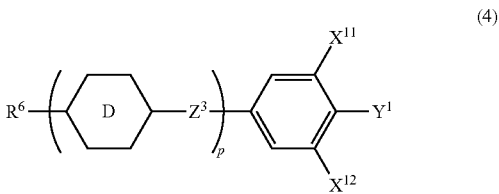
(4)

in formula (4), $R^6$ is alkyl having 1 to 12 carbons, alkoxy having 1 to 12 carbons or alkenyl having 2 to 12 carbons; ring D is 1,4-cyclohexylene, 1,4-phenylene, 2-fluoro-1,4-phenylene, 2,6-difluoro-1,4-phenylene, pyrimidine-2,5-diyl, 1,3-dioxane-2,5-diyl or tetrahydropyran-2,5-diyl; is a single bond, ethylene, carbonyloxy or difluoromethyleneoxy; $X^{11}$ and $X^{12}$ are independently hydrogen or fluorine; $Y^1$ is fluorine, chlorine, alkyl having 1 to 12 carbons in which at least one hydrogen has been replaced by halogen or alkoxy having 1 to 12 carbons in which at least one hydrogen has been replaced by halogen; and p is 1, 2, 3 or 4.

9. The liquid crystal composition according to claim 1, comprising at least one compound selected from the group of compounds represented by formula (4-1) to formula (4-27) as a fourth component:

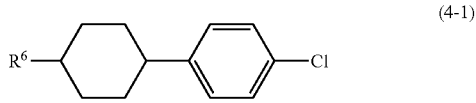
(4-1)

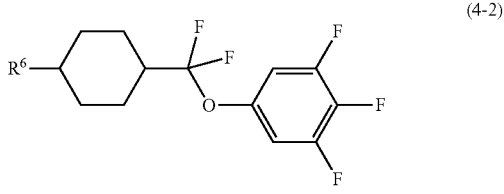
(4-2)

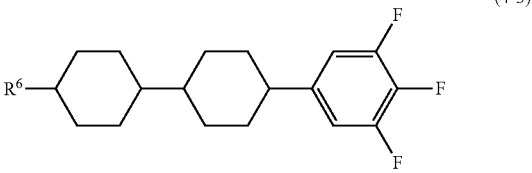
(4-3)

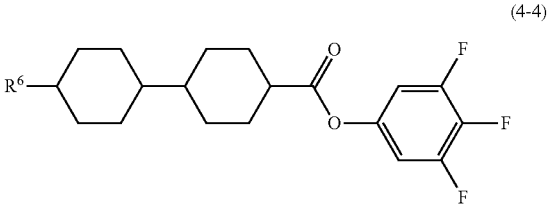
(4-4)

(4-5)
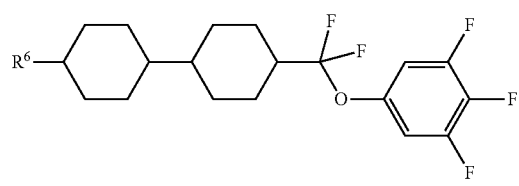
(4-6)
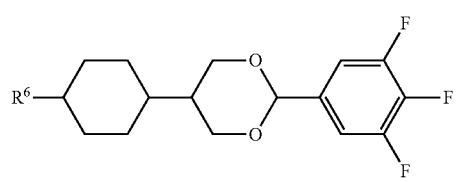
(4-7)
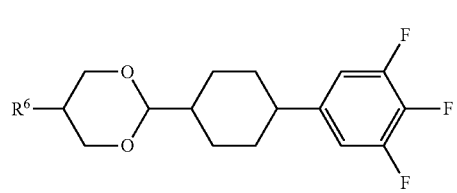
(4-8)
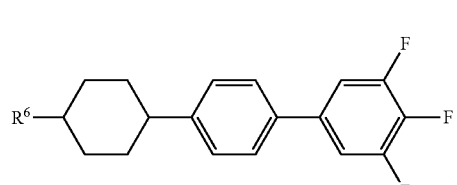
(4-9)
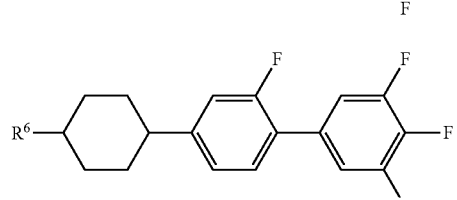
(4-10)
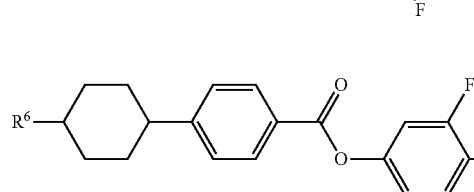
(4-11)
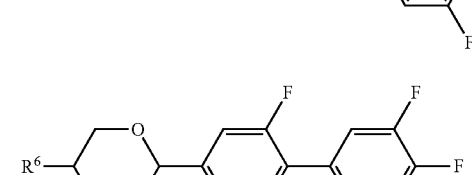
(4-12)
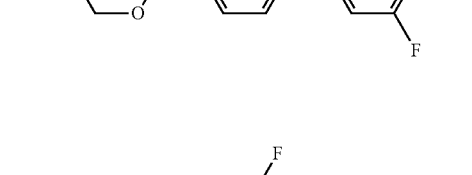
(4-13)
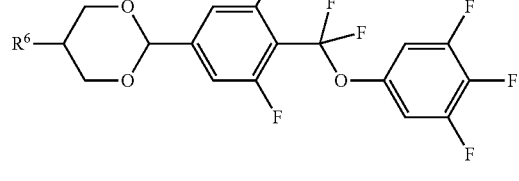
(4-14)
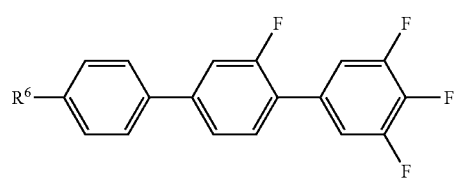
(4-15)
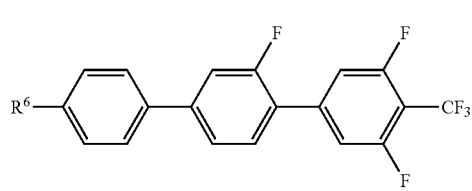
(4-16)
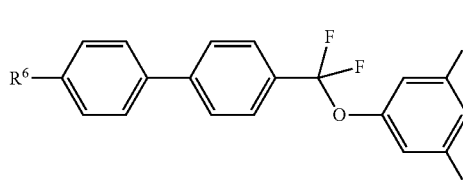
(4-17)
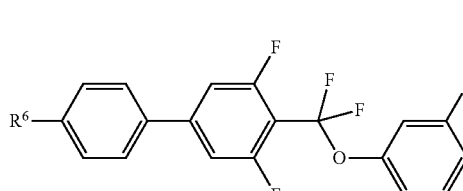
(4-18)
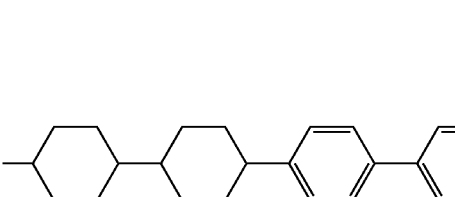
(4-19)
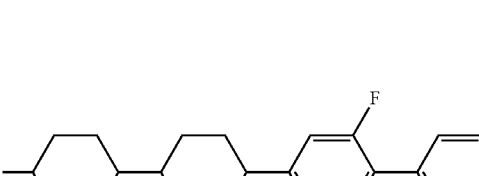
(4-20)
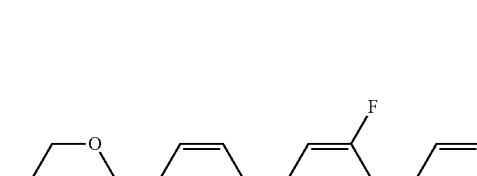

-continued
(4-21) 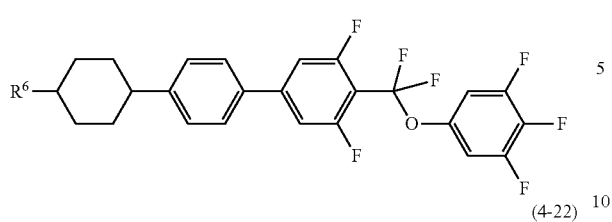
(4-22) 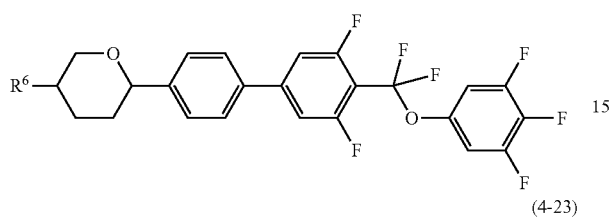
(4-23) 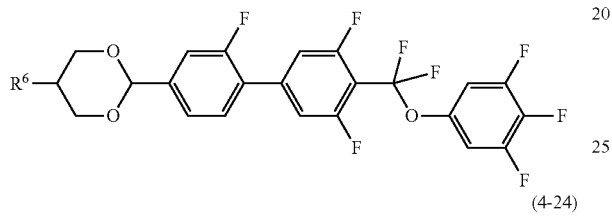
(4-24) 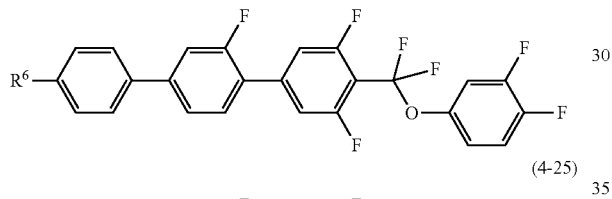
(4-25) 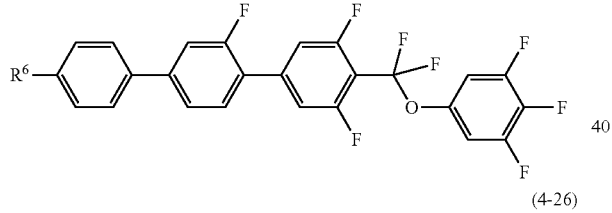
(4-26) 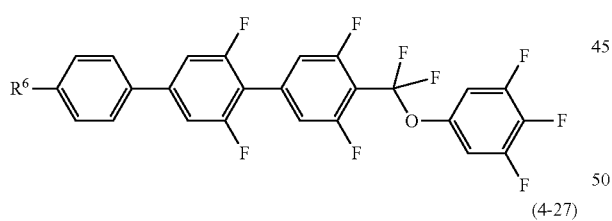
(4-27) 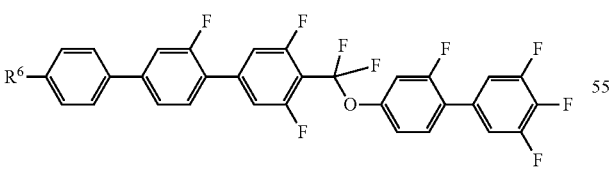
in formula (4-1) to formula (4-27), $R^6$ is alkyl having 1 to 12 carbons, alkoxy having 1 to 12 carbons or alkenyl having 2 to 12 carbons.
10. The liquid crystal composition according to claim 4, comprising at least one compound selected from the group of compounds represented by formula (4-1) to formula (4-27) as a fourth component:
(4-1) 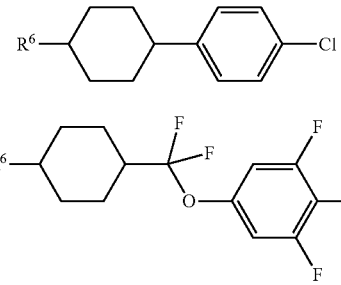
(4-2) 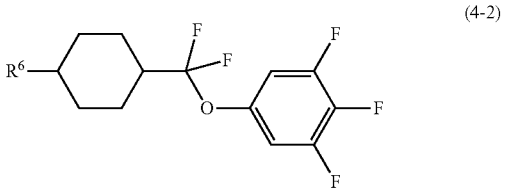
(4-3) 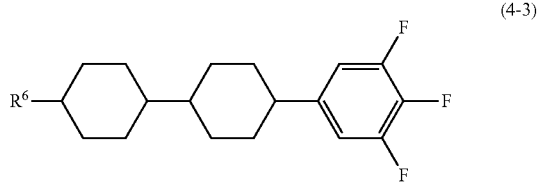
(4-4) 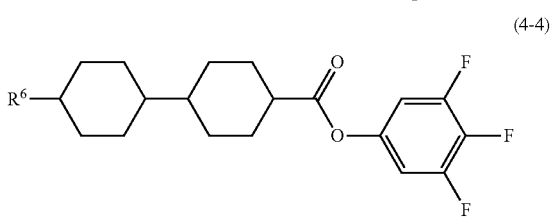
(4-5) 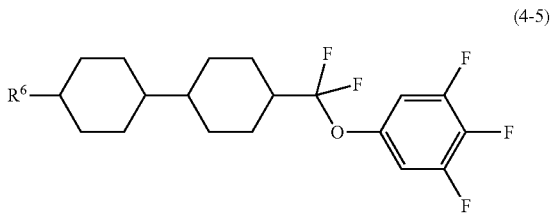
(4-6) 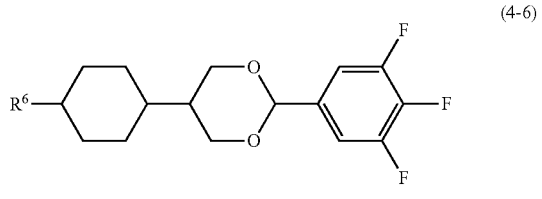
(4-7) 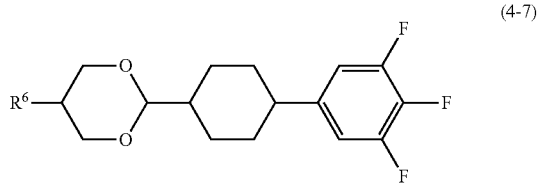
(4-8) 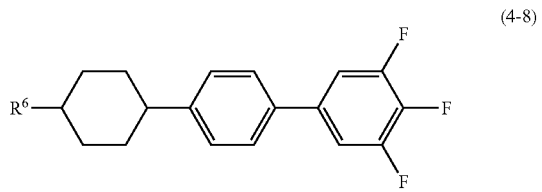
(4-9) 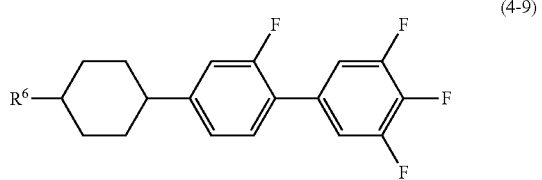

(4-10) 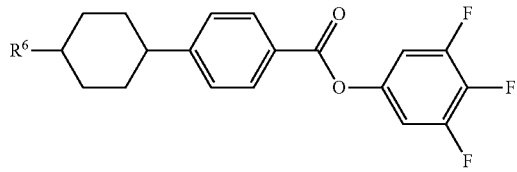
(4-11) 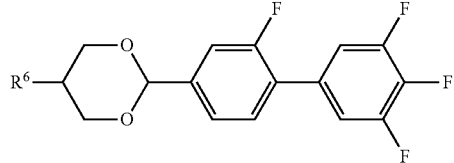
(4-12) 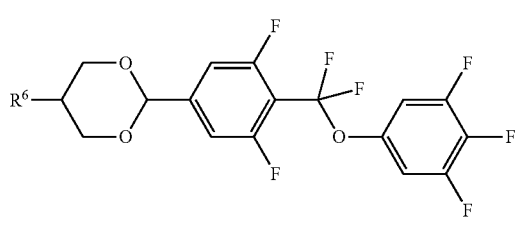
(4-13) 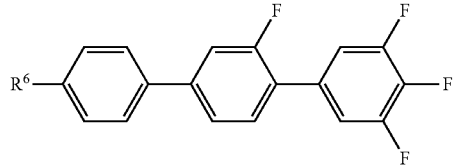
(4-14) 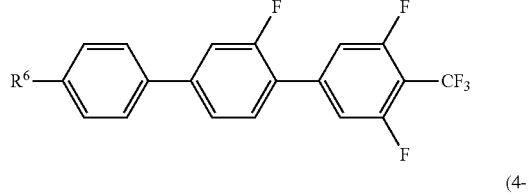
(4-15) 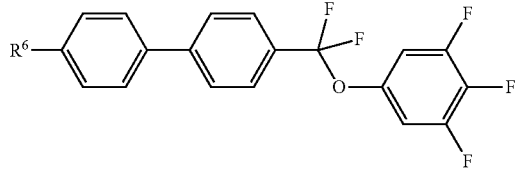
(4-16) 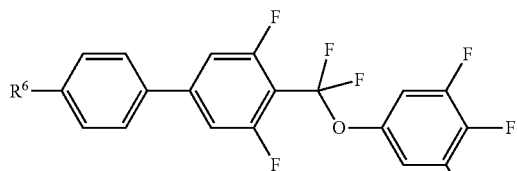
(4-17) 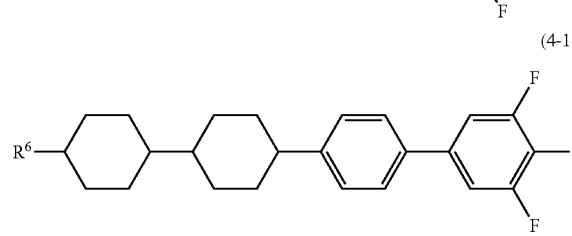
(4-18) 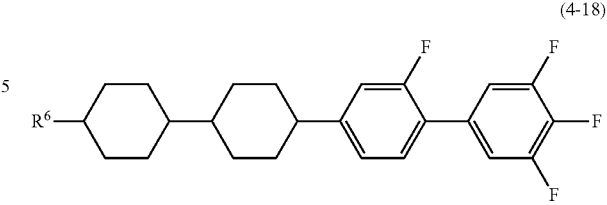
(4-19) 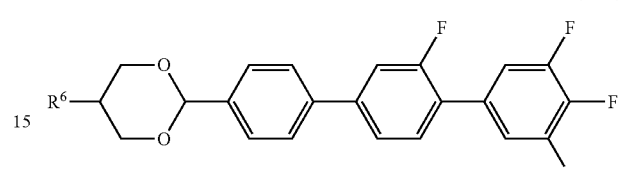
(4-20) 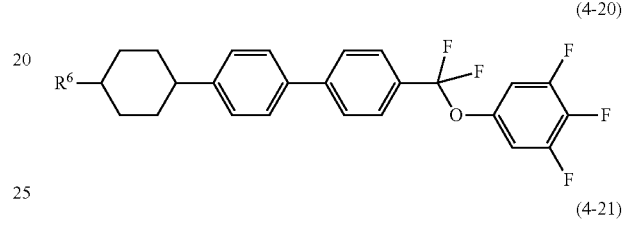
(4-21) 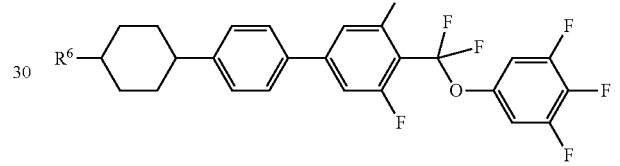
(4-22) 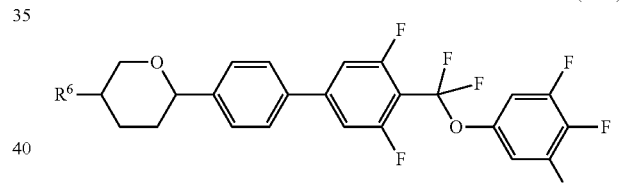
(4-23) 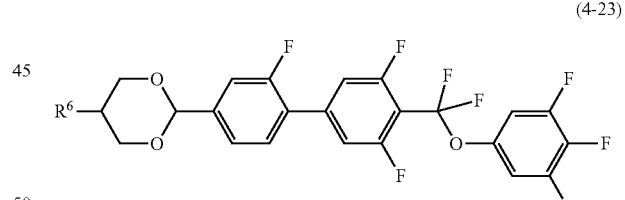
(4-24) 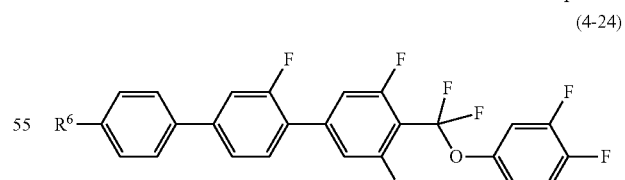
(4-25) 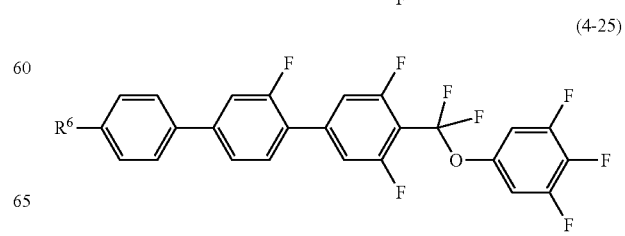

-continued

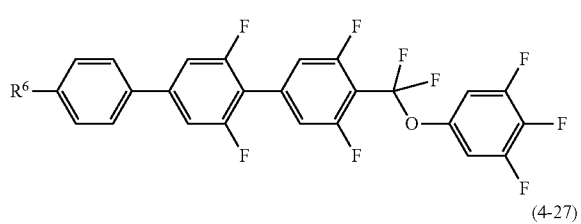
(4-26)

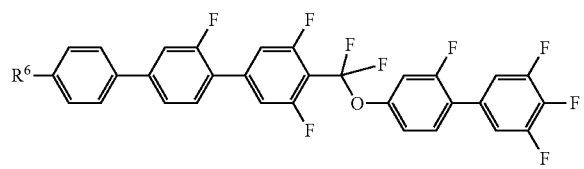
(4-27)

in formula (4-1) to formula (4-27), $R^6$ is alkyl having 1 to 12 carbons, alkoxy having 1 to 12 carbons or alkenyl having 2 to 12 carbons.

11. The liquid crystal composition according to claim 7, wherein a ratio of the fourth component is in the range of 5% by weight to 50% by weight based on the weight of the liquid crystal composition.

12. The liquid crystal composition according to claim 1, wherein a maximum temperature of the nematic phase is 70° C. or higher, and an optical anisotropy (measured at 25° C.) at a wavelength of 589 nanometers is 0.07 or more, and a dielectric anisotropy (measured at 25° C.) at a frequency of 1 kHz is 2 or more.

13. A liquid crystal display device comprising the liquid crystal composition according to claim 1.

14. The liquid crystal display device according to claim 13, wherein an operating mode of the liquid crystal display device is a TN mode, an ECB mode, an OCB mode, an IPS mode or a FPA mode, and the driving mode of the liquid crystal display device is an active matrix mode.

* * * * *